(12) United States Patent
Lipka et al.

(10) Patent No.: US 11,768,869 B2
(45) Date of Patent: Sep. 26, 2023

(54) KNOWLEDGE-DERIVED SEARCH SUGGESTION

(71) Applicant: ADOBE INC., San Jose, CA (US)

(72) Inventors: Nedim Lipka, Campbell, CA (US); Seyedsaed Rezayidemne, Athens, GA (US); Vishwa Vinay, Bangalore (IN); Ryan Rossi, Santa Clara, CA (US); Franck Dernoncourt, San Jose, CA (US); Tracy Holloway King, Mountain View, CA (US)

(73) Assignee: ADOBE, INC., San Jose, CA (US)

( * ) Notice: Subject to any disclaimer, the term of this patent is extended or adjusted under 35 U.S.C. 154(b) by 68 days.

(21) Appl. No.: 17/170,520

(22) Filed: Feb. 8, 2021

(65) Prior Publication Data

US 2022/0253477 A1     Aug. 11, 2022

(51) Int. Cl.
| | |
|---|---|
| *G06F 16/50* | (2019.01) |
| *G06N 5/02* | (2023.01) |
| *G06F 40/20* | (2020.01) |
| *G06F 16/532* | (2019.01) |
| *G06F 16/55* | (2019.01) |
| *G06F 16/56* | (2019.01) |

(52) U.S. Cl.
CPC .......... *G06F 16/532* (2019.01); *G06F 16/55* (2019.01); *G06F 16/56* (2019.01); *G06F 40/20* (2020.01); *G06N 5/02* (2013.01)

(58) Field of Classification Search
CPC ........ G06F 16/532; G06F 16/55; G06F 16/56; G06F 40/20; G06N 5/02
See application file for complete search history.

(56) References Cited

U.S. PATENT DOCUMENTS

| | | | | |
|---|---|---|---|---|
| 2020/0401908 | A1* | 12/2020 | Ortega | G06K 9/6261 |
| 2021/0192375 | A1* | 6/2021 | Xia | G06N 20/00 |
| 2022/0179882 | A1* | 6/2022 | Cervantes | G06F 16/285 |

OTHER PUBLICATIONS

Aashish Misraa et al., "Multi-Modal Retrieval using Graph Neural Networks," arXiv preprint, arXiv:2010.01666v1 [cs.IR] Oct. 4, 2020, 8 pages (Year: 2020).*

(Continued)

*Primary Examiner* — Kristopher Andersen
(74) *Attorney, Agent, or Firm* — F. CHAU & ASSOCIATES, LLC

(57) ABSTRACT

The present disclosure describes systems and methods for information retrieval. Embodiments of the disclosure provide a retrieval network that leverages external knowledge to provide reformulated search query suggestions, enabling more efficient network searching and information retrieval. For example, a search query from a user (e.g., a query mention of a knowledge graph entity that is included in a search query from a user) may be added to a knowledge graph as a surrogate entity via entity linking. Embedding techniques are then invoked on the updated knowledge graph (e.g., the knowledge graph that includes additional edges between surrogate entities and other entities of the original knowledge graph), and entities neighboring the surrogate entity are retrieved based on the embedding (e.g., based on a computed distance between the surrogate entity and candidate entities in the embedding space). Search results can then be ranked and displayed based on relevance to the neighboring entity.

18 Claims, 9 Drawing Sheets

(56) References Cited

OTHER PUBLICATIONS

Sharma, et al., "Learning Representations using Spectral-Biased Random Walks on Graphs", arXiv:2005.09752v2 [cs.LG] Jul. 29, 2020, 13 pages.
Shi, et al., "Entity set expansion in knowledge graph: a heterogeneous information network perspective", Front. Comput. Sci., 2021, 15(1): 151307, pp. 1-12.
Sun, et al., "Rotate: Knowledge Graph Embedding by Relational Rotation in Complex Space", ICLR 2019, pp. 1-18.
Tay, et al, "Random Semantic Tensor Ensemble for Scalable Knowledge Graph Link Prediction", WSDM 2017, Feb. 6-10, 2017, Cambridge, United Kingdom, pp. 751-760.
Tay, et al, "Non-Parametric Estimation of Multiple Embeddings for Link Prediction on Dynamic Knowledge Graphs", Proceedings of the Thirty-First AAAI Conference on Artificial Intelligence (AAAI-17), pp. 1243-1249.
Toutanova, et al., "Representing Text for Joint Embedding of Text and Knowledge Bases" Redmond, WA, 11 pages.
Verma, et al., "Using Image Captions and Multitask Learning for Recommending Query Reformulations", arXiv:2003.00708v1 [cs.IR] Mar. 2, 2020, 14 pages.
Vrandecic, et al., "Wikidata: A Free Collaborative Knowledgebase", Communications of the ACM, Oct. 2014, vol. 57, No. 10, pp. 78-85.
Wang, et al., "Deep Reinforced Query Reformulation for Information Retrieval", DRL4IR, Jul. 30, 2020, Virtual Event, China, arXiv:2007.07987v1 [cs.IR] Jul. 15, 2020, 10 pages.
Wang, et al., "Knowledge Graph Embedding via Graph Attenuated Attention Networks", Digital Object Identifier 10.1109/ACCESS.2019.2963367, pp. 5212-5224.
Wolf, et al., "Transformers: State-of-the-Art Natural Language Processing", arXiv:1910.03771v5 [cs.CL] Jul. 14, 2020, 8 pages.
Wu, et al., "Scalable Zero-shot Entity Linking with Dense Entity Retrieval", arXiv:1911.03814v3 [cs.CL] Sep. 29, 2020, 11 pages.
Wu, et al., "Query Suggestion with Feedback Memory Network", WWW 2018, Apr. 23-27, 2018, Lyon, France, pp. 1563-1571.
Yamada, et al., "An End-to-End Entity Linking Approach for Tweets", Microposts2015 • 5th Workshop on Making Sense of Microposts, 2 pages.
Zhang, et al., "Beyond Link Prediction: Predicting Hyperlinks in Adjacency Space", Association for the Advancement of Artificial Intelligence, 8 pages.
Zhang, et al., "Link Prediction Based on Graph Neural Networks", 32nd Conference on Neural Information Processing Systems (NeurIPS 2018), Montréal, Canada, 11 pages.
Zhang, et al., "Weisfeiler-Lehman Neural Machine for Link Prediction", KDD'17, Aug. 13-17, 2017, Halifax, NS, Canada, pp. 575-583.
Zheleva, et al., "Using Friendship Ties and Family Circles for Link Prediction", The 2nd SNA-KDD Workshop '08 ( SNA-KDD'08), Aug. 24, 2008, Las Vegas, Nevada, USA, 6 pages.
Zhong, et al., "Personalized Query Suggestions", SIGIR '20, Jul. 25-30, 2020, Virtual Event, China, pp. 1645-1648.
Ahmad, et al., "Link Prediction Across Multiple Social Networks", 2010 IEEE International Conference on Data Mining Workshops, pp. 911-918.
Ahmed, et al., "Role-based Graph Embeddings", IEEE Transactions on Knowledge and Data Engineering, vol. YY, No. X, Jul. 2020, pp. 1-15.
Aiello, et al., "Friendship Prediction and Homophily in Social Media", ACM Transactions on the Web, vol. 6, No. 2, Article 9, Publication date: May 2012, pp. 9:1-9:33.
Balazevic, et al., "TuckER: Tensor Factorization for Knowledge Graph Completion", arXiv:1901.09590v2 [cs.LG] Aug. 24, 2019, 11 pages.
Bamler, et al., "Augmenting and Tuning Knowledge Graph Embeddings", 11 pages.
Benson, et al., "Simplicial closure and higher-order link prediction", arXiv:1802.06916v2 [cs.SI] Dec. 11, 2018, 28 pages.
Bordes, et al., "Translating Embeddings for Modeling Multi-relational Data", 9 pages.
Lin et al., "Query Reformulation using Query History for Passage Retrieval in Conversational Search", arXiv:2005.02230v1 [cs.CL] May 5, 2020, 11 pages.
Cucerzan, "Large-Scale Named Entity Disambiguation Based on Wikipedia Data", Microsoft Research, Redmond, WA, 9 pages.
Das, et al. "Sequence-to-Set Semantic Tagging: End-to-End Multilabel Prediction using Neural Attention for Complex Query Reformulation and Automated Text Categorization", arXiv:1911.04427v1 [cs.CL] Nov. 11, 2019, 8 pages.
Datta, et al., "Multimodal Retrieval using Mutual Information based Textual Query Reformulation", Expert Systems With Applications 68 (2017), pp. 81-92.
Daza, et al., Inductive Entity Representations from Text via Link Prediction:, arXiv:2010.03496v1 [cs.CL] Oct. 7, 2020, 11 pages.
Dehghani, et al., "Learning to Attend, Copy, and Generate for Session-Based Query Suggestion", arXiv:1708.03418v4 [cs.IR] Nov. 13, 2017, 10 pages.
Duan, et al., "An Ensemble Approach to Link Prediction", IEEE Transactions on Knowledge and Data Engineering, vol. 29, No. 11, Nov. 2017, pp. 2402-2416.
Fang, et al., "Joint Entity Linking with Deep Reinforcement Learning", arXiv:1902.00330v1 [cs.CL] Feb. 1, 2019, 10 pages.
Garcia-Gasulla, et al., "Hierarchical Hyperlink Prediction for the WWW", arXiv:1611.09084v1 [cs.DS] Nov. 28, 2016, 26 pages.
Gesese, et al., "Semantic Entity Enrichment by Leveraging Multi-lingual Descriptions for Link Prediction", CEUR-WS.org/Vol-2635/paper7.pdf, 6 pages.
Gunes, et al., Link prediction using time series of neighborhood-based node similarity scores, Data Min Knowl Disc (2016), 30, pp. 147-180.
Guo et al., "Robust Named Entity Disambiguation with Random Walks", Semantic Web 0 (0), IOS Press, pp. 1-20.
Hao, et al., Inductive Link Prediction for Nodes Having Only Attribute Information, Proceedings of the Twenty-Ninth International Joint Conference on Artificial Intelligence (IJCAI-20), pp. 1209-1215.
Hasan, "A Survey of Link Prediction in Social Networks", ResearchGate, 25 pages.
Hasibi, et al., "Dynamic Factual Summaries for Entity Cards", SIGIR '17, Aug. 7-11, 2017, Shinjuku, Tokyo, Japan, 10 pages.
Hirsch, et al., "Query Reformulation in E-Commerce Search", SIGIR '20, Jul. 25-30, 2020, Virtual Event, China, pp. 1319-1328.
Hoffart, et al., "Robust Disambiguation of Named Entities in Text", Proceedings of the 2011 Conference on Empirical Methods in Natural Language Processing, pp. 782-792, Edinburgh, Scotland, UK, Jul. 27-31, 2011.
Huang, et al., "Knowledge Graph Embedding Based Question Answering", The Twelfth ACM International Conference on Web Search and Data Mining (WSDM '19), Feb. 11-15, 2019, Melbourne, VIC, Australia. ACM, New York, NY, USA, 9 pages.
Jansen, et al., "Defining a Session on Web Search Engines", Journal of the American Society for Information Science and Technology, 58(6):862-871, 2007.
Jiang, et al., "Learning graph representations of biochemical networks and its application to enzymatic link prediction", arXiv:2002.03410v1 [q-bio-MN] Feb. 9, 2020, 7 pages.
Jiang, et al., "RIN: Reformulation Inference Network for Context-Aware Query Suggestion", CIKM'18, Oct. 22-26, 2018, Torino, Italy, pp. 197-206.
Kashima, et al., "Link Propagation: A Fast Semi-supervised Learning Algorithm for Link Prediction", pp. 1100-1111.
Kazemi et al., "SimplE Embedding for Link Prediction in Knowledge Graphs", Conference on Neural Information Processing Systems (NIPS 2018), arXiv:1802.04868v2 [stat.ML] Oct. 26, 2018, 12 pages.
Kumar et al., "Link prediction in complex networks based on Significance of Higher-Order Path Index (SHOPI)", Elsevier, Physica A 545 (2020), 123790, 17 pages.

(56) References Cited

OTHER PUBLICATIONS

Lerer, et al., "Pytorch-Biggraph: A Large-Scale Graph Embedding System", Proceedings of the 2nd SysML Conference, Pato Alto, CA, USA, 2019, arXiv:1903.2287v3 [cs.LG] Apr. 9, 2019, 12 pages.

Li, et al., "Exploring Query Auto-Completion and Click Logs for Contextual-Aware Web Search and Query Suggestion", WWW 2017, Apr. 3-7, 2017, Perth, Australia, pp. 539-548.

Li, et al., "Click Feedback-Aware Query Recommendation Using Adversarial Examples", Proceedings of the 2019 World Wide Web Conference (WWW '19), May 13-17, 2019, San Francisco, pp. 2978-2984.

Lissandrini, et al., "Graph-Query Suggestions for Knowledge Graph Exploration", WWW '20, Apr. 20-24, 2020, Taipei, Taiwan, 7 pages.

Milne, et al., "Learning to Link with Wikipedia", CIKM'08, Oct. 26-30, 2008, Napa Valley, California, USA, pp. 509-518.

Moro, et al., "Entity Linking meets Word Sense Disambiguation: a Unified Approach", 1 page.

Nogueira, et al., "Task-Oriented Query Reformulation with Reinforcement Learning", arXiv:1704.04572v4 [cs.IR] Sep. 24, 2017, 10 pages.

Pachev, et al., "Fast link prediction for large networks using spectral embedding", arXiv:1703.09693v1 [cs.SI] Mar. 28, 2017, 13 pages.

Pass, et al., "A Picture of Search", INFOSCALE '06. Proceedings of the First International Conference on Scalable Information Systems, May 29-Jun. 1, 2006, Hong Kong, 7 pages.

Pujara, et al., "Sparsity and Noise: Where Knowledge Graph Embeddings Fall Short", University of California, Santa Cruz, 6 pages.

Ratinov, et al., "Local and Global Algorithms for Disambiguation to Wikipedia", Proceedings of the 49th Annual Meeting of the Association for Computational Linguistics, pp. 1375-1384,Portland, Oregon, Jun. 19-24, 2011, pp. 1375-1384.

Rosset, et al., "Leading Conversational Search by Suggesting Useful Questions", WWW '20, Apr. 20-24, 2020, Taipei, Taiwan, 11 pages.

Rossi, et al., "Deep Inductive Network Representation Learning", WWW '18 Companion, Apr. 23-27, 2018, Lyon, France, 8 pages.

Rossi, et al., "Knowledge Graph Embedding for Link Prediction: A Comparative Analysis", arXiv:2002.00819v1 [cs.LG] Feb. 3, 2020, pp. 1-42.

Rosso, et al., "Beyond Triplets: Hyper-Relational Knowledge Graph Embedding for Link Prediction", WWW '20, Apr. 20-24, 2020, Taipei, Taiwan, 11 pages.

Salha, et al., "Gravity-Inspired Graph Autoencoders for Directed Link Prediction", arXiv:1905.09570v4 [cs.LG] Dec. 5, 2019, 10 pages.

Salha, et al., "Simple and Effective Graph Autoencoders with One-Hop Linear Models", arXiv:2001.07614v1 [cs.LG] Jan. 21, 2020, 7 pages.

Sevgili, et al., "Improving Neural Entity Disambiguation with Graph Embeddings", Proceedings of the 57th Annual Meeting of the Association for Computational Linguistics: Student Research Workshop, pp. 315-322, Florence, Italy, Jul. 28-Aug. 2, 2019.

Shao, et al., "Community Detection and Link Prediction via Cluster-driven Low-rank Matrix Completion", Proceedings of the Twenty-Eighth International Joint Conference on Artificial Intelligence (IJCAI-19), pp. 3382-3388.

* cited by examiner

Algorithm 1 Link Prediction Process

Input: Knowledge Graph $G$ and set of queries $Q$
Output: Predicted links $L$
1: for each $q \in Q$ do
2:      $m \leftarrow$ mention in $q$
3:      $S_q[q] = \{e_m, \text{confidence} \mid q : m \mapsto e_m \in \mathcal{E}\}$
4:      for each $(e_m, \text{confidence}) \in S_q[q]$ do
5:          Add $(m, \text{confidence}, e_m)$ to $G$
6:      end for
7: end for
8: Calculate embeddings for all the nodes in enhanced $G$
9: Calculate $M$ which is the $k$NN matrix for all of the embedding vectors.    *# $k$ is the number of predicted/suggested tail entities*
10: $L = \{\}$    *# predicted links/tails per query*
11: for each $q \in Q$ do
12:      $e_t \leftarrow$ true entity for mention $m$ present in $q$
13:      for each $e_m \in S_q[q]$ do
14:          for each $(\hat{t}, \text{distance}) \in M[e_m]$ do
15:              $L[q].append(e_t, \text{distance}, \hat{t})$
16:          end for
17:      end for
18: end for

FIG. 7

KNOWLEDGE-DERIVED SEARCH SUGGESTION

BACKGROUND

The following relates generally to information retrieval, and more specifically to knowledge-derived search suggestion.

Information retrieval refers to the task of extracting information resources based on a query. In some cases, information retrieval includes identifying relevant search objects from a database and comparing the search objects to a query object. For example, a user may provide a text description or an image as a query, and a search engine may find images that are similar or relevant to the query.

In some cases, information retrieval systems represent query objects and search objects as a vectors in an embedding space. The vector representations may capture the semantic meaning and other attributes such as color information, meta-data, or classification tags. An information retrieval system such as a search engine can retrieve relevant documents by comparing the embedded representation of the query to the embedded representations of the documents in a database (i.e., the search objects).

Recently, information retrieval systems have used neural networks and other sophisticated embedding systems to generate complex, high dimensional embeddings that are capable of comparing and differentiating a large number of different text or image objects. However, search engines for domain-specific media collections rely on rich metadata annotations. In some cases, these annotations may not be complete or rich enough to support an adequate level of retrieval effectiveness. As a result, some search queries may have low recall (e.g., a search query may receive only a small result set) or low precision (e.g., a search query may receive a result set with reduced relevance to the search query). Therefore, there is a need in the art for improved information retrieval system for media collections.

SUMMARY

The present disclosure describes systems and methods for information retrieval. Embodiments of the disclosure provide a retrieval network that leverages external knowledge to provide search query suggestions, enabling more efficient network searching and information retrieval. In some embodiments, entity mentions from a search query from a user may be added to a knowledge graph. The updated knowledge graph is then converted into a vector space (i.e., an updated embedding space), and additional search results are obtained based on the updated embedding space.

A method, apparatus, non-transitory computer readable medium, and system for knowledge-derived search suggestion are described. Embodiments of the method, apparatus, non-transitory computer readable medium, and system are configured to identify a search query comprising a least one query mention, update a knowledge graph with a surrogate entity corresponding to the at least one query mention and with a plurality of connection elements connecting the surrogate entity to a plurality of entities in the knowledge graph, and retrieve search results based at least in part on at least one neighboring entity of the surrogate entity in the updated knowledge graph.

A method, apparatus, non-transitory computer readable medium, and system for knowledge-derived search suggestion are described. Embodiments of the method, apparatus, non-transitory computer readable medium, and system are configured to identify a query mention, identify entities in a knowledge graph for the query mention using a linking algorithm, update the knowledge graph with a surrogate entity corresponding to the at least one query mention and with a plurality of connection elements connecting the surrogate entity to the entities, generate a vector representation for the surrogate entity and a plurality of candidate entities of the updated knowledge graph, compute a distance between the surrogate entity and each of the candidate entities based on the vector representation, and select a neighboring entity from among the candidate entities based on the computed distance.

An apparatus, system, and method for knowledge-derived search suggestion are described. Embodiments of the apparatus, system, and method are configured to an entity linking component configured to identify entities in a knowledge graph for a query mention, a knowledge graph component configured to update the knowledge graph with a surrogate entity corresponding to the at least one query mention and with a plurality of connection elements connecting the surrogate entity to the entities, an embedding component configured to generate a vector representation for entities of the knowledge graph, and a neighbor selection component configured to select a neighboring entity for the surrogate entity based on the vector representation.

BRIEF DESCRIPTION OF THE DRAWINGS

FIG. 7 shows an example of a process for link prediction according to aspects of the present disclosure.

DETAILED DESCRIPTION

Figure 1:
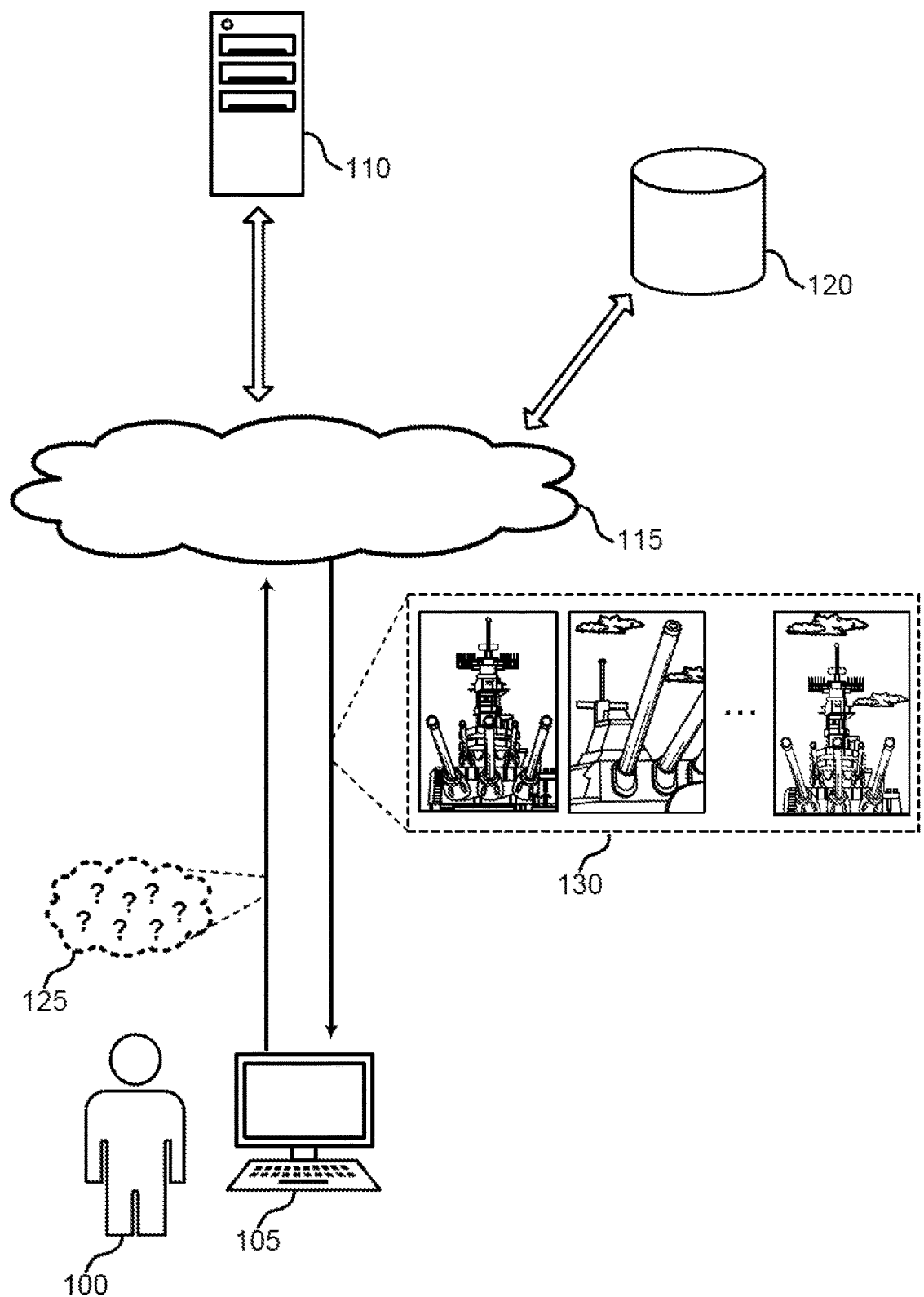
FIG. 1 shows an example of a system for information retrieval according to aspects of the present disclosure.

The present disclosure describes systems and methods for information retrieval. Embodiments of the disclosure provide a retrieval network that leverages external knowledge to provide reformulated search query suggestions by adding mentions from a search query to a knowledge graph as surrogate entities (i.e., using an entity linking algorithm). The updated knowledge graph includes additional edges between the surrogate entity and linked entities of the knowledge graph. Neighboring the surrogate entity can then be efficiently retrieved based on the updated knowledge graph.

Information retrieval systems (e.g., search engines) have used embedding networks to represent query objects and search objects in a common embedding space using dense, high-dimensional vector representations. However, such information retrieval systems may rely on rich metadata annotations being available for the search objects (e.g., the text, images, or media being searched). In some cases, image search engines may rely on image metadata information in order to accomplish routine and tedious sorting and prioritizing tasks associated with image searching.

As a result, these systems may not perform well in some scenarios, as some user search queries may retrieve only a small set of results (e.g., have low recall) or may retrieve less relevant results (e.g., have low precision). For example, a user might search for images related to "US Navy Shipyard". The information retrieval system may not have many images with metadata related to this search query. Thus, the number of image results provided to the user may be insufficient, even if the database being searched includes images relevant to the user's query. If the information retrieval system provides expanded results, the images may be irrelevant to the user.

Embodiments of the present disclosure provide an improved retrieval network that generates or reformulates search queries to retrieve more results or more precise search results. In some examples, the retrieval network updates a knowledge graph to include one or more surrogate entities corresponding to query mentions in a search query. The surrogate entities are linked to other entities in the knowledge graph based on an entity linking network or algorithm. The retrieval network then generates an embedding space based on the updated knowledge graph and retrieves additional search results by selecting neighboring entities in the embedding space. In some embodiments, an updated search query is generated based on the selected neighboring entity, and the retrieval network retrieves search results based on the updated search query.

By applying the unconventional step of adding a query mention as a surrogate entity to a knowledge graph, embodiments of the present disclosure identify entities relevant to a search query that may not be found directly based on metadata. As a result, embodiments of the present disclosure provide more search results and more precise search results, even in cases where content metadata annotations is not complete or rich.

Embodiments of the present disclosure may be used in the context of an image search engine. For example, a retrieval network based on the present disclosure may take natural language text or an image as a query, and efficiently search through millions of images to find images relevant to the query (e.g., or the reformulated query). An example of an embodiment of the inventive concept in the image search context is provided with reference to FIGS. 1-3. Details regarding the architecture of an example retrieval network are provided with reference to FIGS. 4 and 5. Examples of processes for updating knowledge graphs and retrieving search results are provided with reference to FIGS. 6-9.

Image Search Application

FIG. 1 shows an example of a system for information retrieval according to aspects of the present disclosure. The example shown includes user 100, device 105, retrieval network 110, cloud 115, and database 120. Retrieval network 110 is an example of, or includes aspects of, the corresponding element described with reference to FIG. 4.

In the example of FIG. 1, a user 100 provides a search query 125 to a browser in a search engine. In the example shown, the search query 125 is a natural language query, and the search objects are images. However, other types of queries and search objects may be used. In some examples, the search query 125 may also be a same media type as the search objects (e.g., an image), or the query may be of a different media type than the search objects (e.g., an audio file, a video file, etc.). In some examples, the search objects themselves include different media types (e.g., audio files, video files, image files, and text files). In some examples, different media types may be combined.

The user 100 communicates with the retrieval network 110 via the user device 105 and the cloud 115. For example, the user 100 may provide a search query 125 including query object such as a text query or an image query. In the example illustrated in FIG. 1, the query object includes a natural language search query. The user device 105 transmits the search query 125 to the retrieval network 110 to find related objects or information (e.g., search objects stored within the database 120). In some examples, the user device 105 communicates with the retrieval network 110 via the cloud 115.

The retrieval network 110 updates a knowledge graph to include a surrogate entity corresponding to a query mention included in a search query 125. The retrieval network 110 then uses embedding techniques on the updated knowledge graph and retrieves search results (e.g., search objects stored in database 120) based on selected neighboring entities. The database 120 returns results 130 including one or more images related to the search query 125 based on the updated knowledge graph (e.g., the knowledge graph that includes additional edges between surrogate entities and other entities of the original knowledge graph). The search results 130 are presented to the user 100. The process of for using the retrieval network 110 to perform an image search is further described with reference to FIG. 2.

The user device 105 may be a personal computer, laptop computer, mainframe computer, palmtop computer, personal assistant, mobile device, or any other suitable processing apparatus. In some cases, the user device includes software such as a web browser that provides access to an image search engine.

The retrieval network 110 includes a computer implemented network that generates an updated knowledge graph to include a surrogate node corresponding to a search query to be searched, and performs a search on a set of media objects using the updated knowledge graph. According to some embodiments, the retrieval network 110 includes a knowledge graph component, an embedding component, and a search component. The knowledge graph component updates a knowledge graph to include a surrogate node corresponding to a search query (e.g., corresponding to a query mention included in a search query). The embedding component generates an embedding for each of the media objects (e.g., entities or nodes) of the updated knowledge graph. The search component retrieves search results based on neighboring entities that are selected as a result of the embedding (e.g., based on a distance between neighboring entities in an embedding space).

The retrieval network 110 may also include a processor unit, a memory unit, and a user interface. Additionally, the retrieval network 110 can communicate with the database 120 via the cloud 115. Further detail regarding the architecture of the retrieval network 110 is provided with reference to FIGS. 4 and 5. Further details regarding the operation of the retrieval network 110 are provided with reference to FIGS. 6-9.

In some cases, the retrieval network 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

In some examples, the retrieval network 110 is an information retrieval system or a search system that performs image or document search based on content understanding. The retrieval network 110 can be used to identify objects, subjects, action, tone, emotion, concepts, aesthetics, style, and media types such as images, videos, documents, composites, etc. In some embodiments, the retrieval network 110 includes an artificial neural network to generate a sparse embedding for each of the media objects. An artificial neural network is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

A cloud 115 is a computer network configured to provide on-demand availability of computer system resources, such as data storage and computing power. In some examples, the cloud 115 provides resources without active management by the user 100. The term cloud 115 is sometimes used to describe data centers available to many users 100 over the Internet. Some large cloud networks have functions distributed over multiple locations from central servers. A server is designated an edge server if it has a direct or close connection to a user 100. In some cases, a cloud 115 is limited to a single organization. In other examples, the cloud 115 is available to many organizations. In one example, a cloud 115 includes a multi-layer communications network comprising multiple edge routers and core routers. In another example, a cloud 115 is based on a local collection of switches in a single physical location.

Database 120 is an example of, or includes aspects of, the corresponding element described with reference to FIG. 5. The database 120 stores the media objects, the knowledge graph, updates to the knowledge graph, the respective embeddings for each of the media objects, etc. In some examples, one or more of the stored media objects are retrieved from the database 120 as a result of a search by the information retrieval network 110.

A database 120 is an organized collection of data. For example, a database 120 stores data in a specified format known as a schema. A database 120 may be structured as a single database, a distributed database, multiple distributed databases, or an emergency backup database. In some cases, a database controller may manage data storage and processing in a database 120. In some cases, a user 100 interacts with database controller. In other cases, database controller may operate automatically without user interaction. In some examples, the database 120 includes a set of media objects (e.g., image files). In some cases, a search is performed based on an updated knowledge graph including a surrogate node corresponding to a query mention (e.g., an entity mention) included in a search query (e.g., a natural language query, a search image file, etc.), and at least one search object (e.g., image file) is retrieved from the database 120. A typical information retrieval system comprises a database 120 or at least some storage system for the media objects, an index, and a ranking function. IN some embodiments, the ranking function assesses the relevance between the user query and a media object. However, the retrieval process becomes more scalable with an index or an inverted index. For example, an entry (e.g., a tag or a word) in the index of the database 120 may point to a list of documents that contain the entry. When working numerical vectors that represent either queries or documents, indexing may function differently. Hashing or sketching techniques can be used to find nearest neighbors efficiently.

An apparatus (e.g., a device 105 including a retrieval network 110) for knowledge-derived search suggestion is described. The apparatus includes a processor, memory in electronic communication with the processor, and instructions stored in the memory. The instructions are operable to cause the processor to identify a search query comprising a least one query mention, update a knowledge graph with a surrogate entity corresponding to the at least one query mention and with a plurality of connection elements connecting the surrogate entity to a plurality of entities in the knowledge graph, and retrieve search results based at least in part on at least one neighboring entity of the surrogate entity in the updated knowledge graph.

A non-transitory computer readable medium storing code for knowledge-derived search suggestion is described. In some examples, the code comprises instructions executable by a processor to: identify a search query comprising a least one query mention, update a knowledge graph with a surrogate entity corresponding to the at least one query mention and with a plurality of connection elements connecting the surrogate entity to a plurality of entities in the knowledge graph, and retrieve search results based at least in part on at least one neighboring entity of the surrogate entity in the updated knowledge graph.

A system for knowledge-derived search suggestion is described. Embodiments of the system are configured to identify a search query comprising a least one query mention, update a knowledge graph with a surrogate entity corresponding to the at least one query mention and with a plurality of connection elements connecting the surrogate entity to a plurality of entities in the knowledge graph, and retrieve search results based at least in part on at least one neighboring entity of the surrogate entity in the updated knowledge graph.

Figure 2:
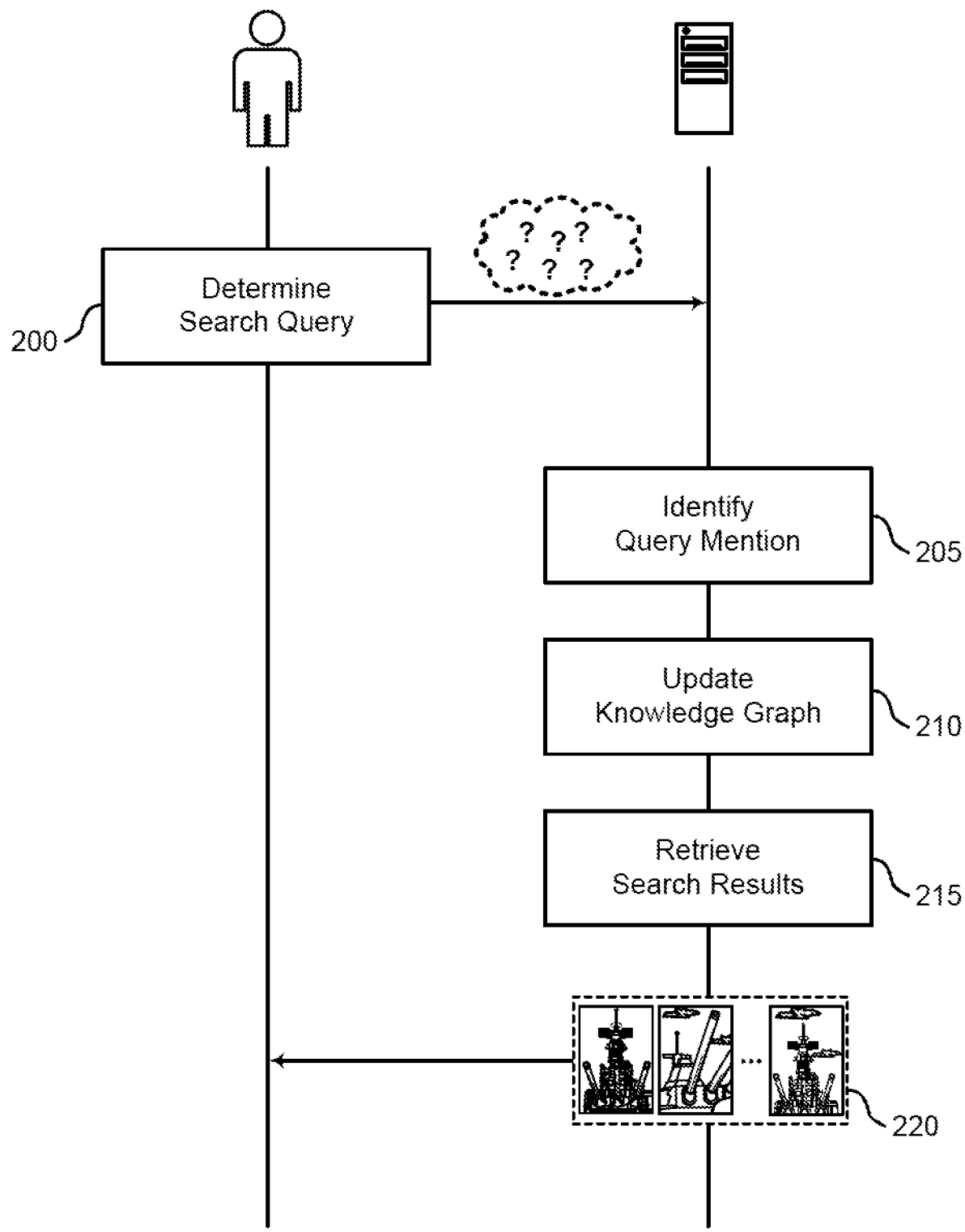
FIG. 2 shows an example of a knowledge-derived search suggestion flowchart according to aspects of the present disclosure.

FIG. 2 shows an example of a knowledge-derived search suggestion flowchart according to aspects of the present disclosure. In some examples, these operations are performed by a system such as the information retrieval system of claim 1. The system may include a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Accordingly, a method for knowledge-derived search suggestion is described. Embodiments of the method are configured to identify a search query comprising a least one query mention, update a knowledge graph with a surrogate entity corresponding to the at least one query mention and with a plurality of connection elements connecting the surrogate entity to a plurality of entities in the knowledge graph, and retrieve search results based at least in part on at least one neighboring entity of the surrogate entity in the updated knowledge graph.

At operation 200, the user determines a search query, and provides it to an image search engine. According to an example, the search query includes a natural language query. The search query herein is for illustrative purpose. However, in practice, a search query may be more complex. Furthermore, embodiments of the present disclosure are not limited to natural language queries. In some cases, the query object can be an audio file, video file, image file, natural language text, text file or any combination of thereof. In some cases, the operations of this step refer to, or may be performed by, a user as described with reference to FIG. 1, using a user interface as described with reference to FIG. 4.

At operation 205, the system identifies a query mention from the received search query. For instance, as described herein, a search query may include a sequence of words, q. Every subsequence of words in the search query (q) that represents an entity (e) in the knowledge graph may be referred to as an entity mention or a query mention (m). Accordingly, the system may analyze the sequence of words of the search query (q), and may identify whether any subsequence of words in the search query (q) includes a query mention (m). In some cases, the operations of this step refer to, or may be performed by, a retrieval network as described with reference to FIGS. 1 and 4.

At operation 210, the system updates a knowledge graph with a surrogate entity corresponding to the identified query mention, and the system updates the knowledge graph with one or more connection elements connecting the surrogate entity to a set of entities in the knowledge graph. In some cases, the operations of this step refer to, or may be performed by, a retrieval network as described with reference to FIGS. 1 and 4.

Accordingly, query mentions (m) in a search query (q) can be linked to knowledge graph entities (e.g., via entity linking). For each mention (m) in the query set, the knowledge graph is updated to add a new entity (e.g., a surrogate entity, $e_m$) corresponding to the query mention (m). Surrogate entities are connected to linked entities if the surrogate entities are present in the knowledge graph. Embeddings are computed for the entities of the updated knowledge graph. For example, embeddings are computed (e.g., via a knowledge graph embedding algorithm) for the knowledge graph that includes additional edges between surrogate entities ($e_m$) and other entities of the original knowledge graph. In some embodiments, as described in more detail herein, the quality of embeddings is measured by the performance of a downstream task.

At operation 215, the system retrieves search results based on at least one neighboring entity of the surrogate entity in the updated knowledge graph. For instance, a vector representation for the surrogate entity and candidate entities of the updated knowledge graph can be generated using a knowledge graph embedding algorithm. A distance between the surrogate entity and each of the candidate entities can be calculated based on the vector representation, and one or more neighboring entities from among the candidate entities may be selected and retrieved based on the computed distances. In some cases, the operations of this step refer to, or may be performed by, a retrieval network as described with reference to FIGS. 1 and 4.

At operation 220, the system displays the retrieved search results corresponding to the neighboring entity (e.g., for the user to view in response to an input search query). In some cases, the operations of this step refer to, or may be performed by, a retrieval network as described with reference to FIGS. 1 and 4.

Figure 3:
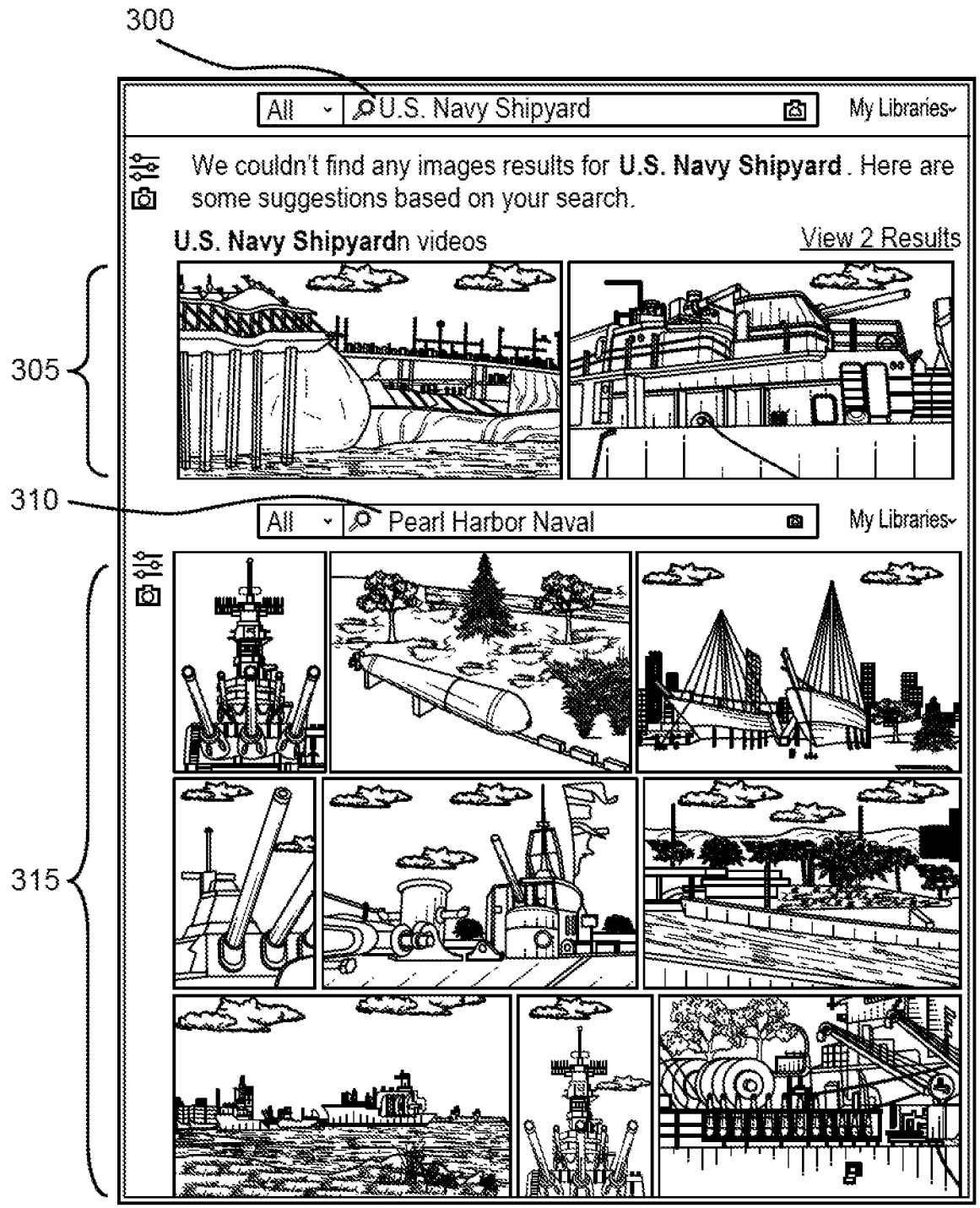
FIG. 3 shows an example of a knowledge-driven search suggestion display according to aspects of the present disclosure.

FIG. 3 shows an example of a knowledge-driven search suggestion display according to aspects of the present disclosure. The example shown includes search query 300, search results 305, updated search query 310, and updated search results 315. For instance, a retrieval network may receive a search query 300 from a user.

In some cases, information retrieval systems may rely on rich metadata annotations being available for search objects (e.g., the images or media being searched). For instance, image search engines may rely on image metadata information in order to accomplish routine and tedious sorting and prioritizing tasks associated with image searching. As a result, these systems may not perform well in some scenarios, as some user search queries may retrieve only a small set of results (e.g., have low recall) or may retrieve less relevant results (e.g., have low precision).

In the example of FIG. 3, a search query 300 may retrieve a small set of search results 305. According to the techniques described herein, an information retrieval system may update a knowledge graph with a surrogate entity ($e_m$) corresponding to at least one query mention (m) included in the sequence (q) of search query 300. For example, a knowledge graph is updated with one or more connection elements connecting the surrogate entity ($e_m$) to other (e.g., existing) entities in the knowledge graph (e.g., a further described herein, for example, with reference to FIGS. 8 and 9.

In some embodiments, the information retrieval system may generate an updated search query 310 based on one or more neighboring entities of the surrogate entity in the updated knowledge graph. As described herein, updated search results 315 associated with updated search query 310 may include more numerous accurate search objects (e.g., images) compared to search results 305. That is, the information retrieval system may reformulate search query 300 and generate updated search query 310, where updated search query 310 can provide updated search results 315 with more results (e.g., higher recall) and more accurate results (e.g., higher precision) compared to search results 305 (e.g., otherwise retrieved based on the search query 300 received from a user).

In some cases, as shown in FIG. 3, the information retrieval system may display the search query 300 and corresponding search results 305, as well as the updated search query 310 and the corresponding updated search results 315 (e.g., such that the user may compare and analyze the updated search query 310 that was reformulated from the search query 300 by the information retrieval system).

Network Architecture

Figure 4:
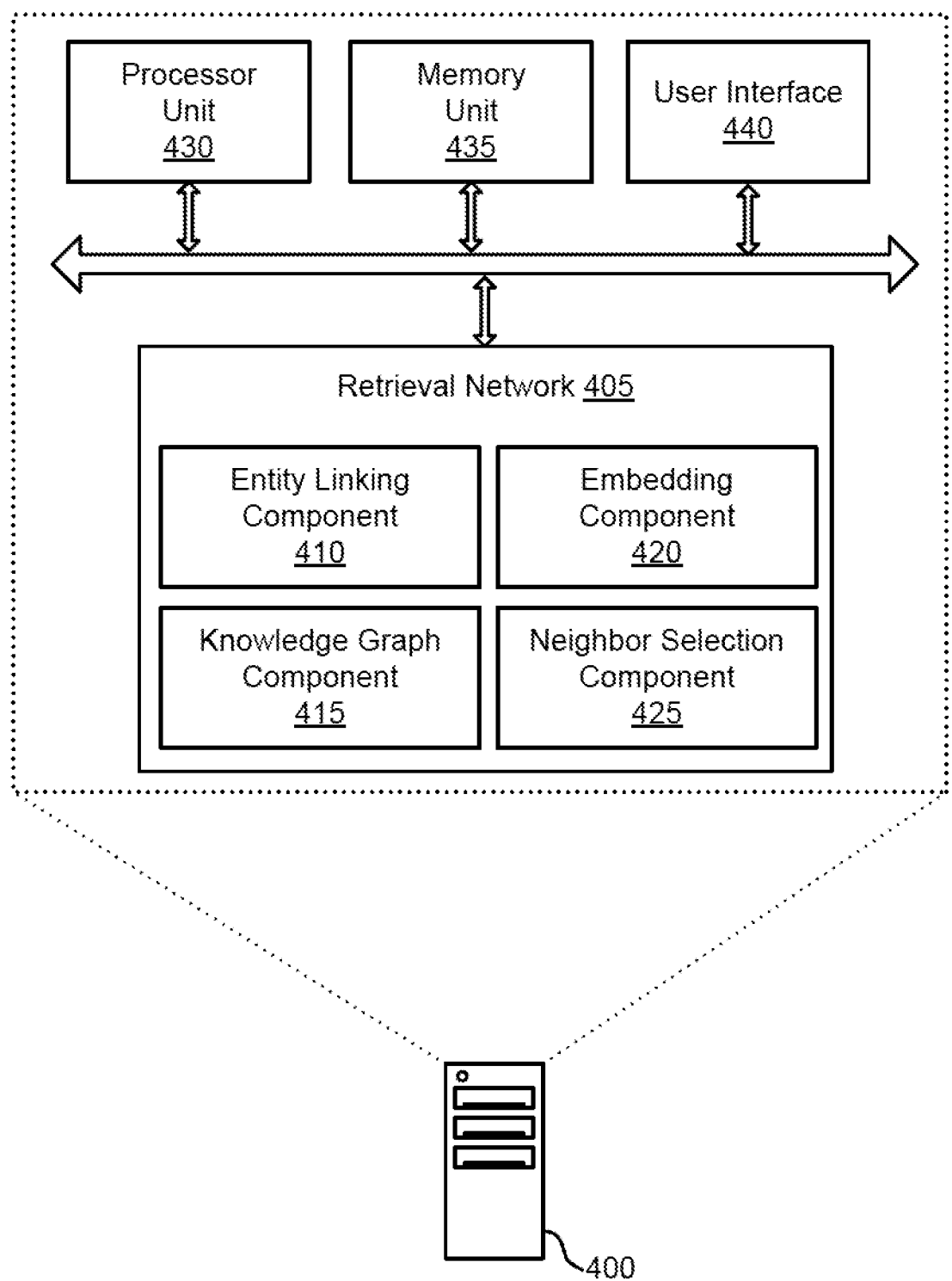
FIG. 4 shows an example of an apparatus for knowledge-driven search suggestion according to aspects of the present disclosure.

FIG. 4 shows an example of an apparatus 400 for knowledge-driven search suggestion according to aspects of the present disclosure. In one embodiment, apparatus 400 includes retrieval network 405, processor unit 430, memory unit 435, and user interface 440. Retrieval network 405 is an example of, or includes aspects of, the corresponding element described with reference to FIG. 1. In one embodiment, retrieval network 405 includes entity linking component 410, knowledge graph component 415, embedding component 420, and neighbor selection component 425.

An apparatus 400 for knowledge-derived search suggestion is described. A retrieval network 405 includes an entity linking component 410 configured to identify entities in a knowledge graph for a query mention, a knowledge graph component 415 configured to update the knowledge graph with a surrogate entity corresponding to the at least one query mention and with a plurality of connection elements connecting the surrogate entity to the entities, an embedding component 420 configured to generate a vector representation for entities of the knowledge graph, and a neighbor selection component 425 configured to select a neighboring entity for the surrogate entity based on the vector representation.

A processor unit 430 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 430 is configured to operate a memory array using a memory controller. In other cases, a memory controller is integrated into the processor unit 430. In some cases, the processor unit 430 is configured to execute computer-readable instructions stored in a memory to perform various functions. In some embodiments, a processor unit 430 includes special purpose components for modem processing, baseband processing, digital signal processing, or transmission processing.

Examples of a memory unit 435 include random access memory (RAM), read-only memory (ROM), or a hard disk. Examples of memory unit 435 include solid state memory and a hard disk drive. In some examples, memory unit 435 is used to store computer-readable, computer-executable software including instructions that, when executed, cause a processor to perform various functions described herein. In some cases, the memory unit 435 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 435 store information in the form of a logical state.

According to some embodiments, entity linking component 410 identifies the entities in the knowledge graph using an entity linking algorithm. In some examples, entity linking component 410 determines a confidence score corresponding to each of the entities based on the entity linking algorithm, where each of the connection elements includes the corresponding confidence score. According to some embodiments, entity linking component 410 identifies entities in a knowledge graph for the query mention using a linking algorithm. According to some embodiments, entity linking component 410 is configured to identify entities in a knowledge graph for a query mention. Entity linking component 410 is an example of, or includes aspects of, the corresponding element described with reference to FIG. 5.

According to some embodiments, knowledge graph component 415 updates a knowledge graph with a surrogate entity corresponding to the at least one query mention and with a set of connection elements connecting the surrogate entity to a set of entities in the knowledge graph. In some examples, the knowledge graph includes a set of entities, a set of relations, and a set of triplets including a head entity (i.e., a source entity), a tail entity (i.e., a target entity), and a relation between the head entity and the tail entity. In some examples, the connection elements have a same structure as the triplets. According to some embodiments, knowledge graph component 415 updates the knowledge graph with a surrogate entity corresponding to the at least one query mention and with a set of connection elements connecting the surrogate entity to the entities. According to some embodiments, knowledge graph component 415 is configured to update the knowledge graph with a surrogate entity corresponding to the at least one query mention and with a plurality of connection elements connecting the surrogate entity to the entities. Knowledge graph component 415 is an example of, or includes aspects of, the corresponding element described with reference to FIG. 5.

According to some embodiments, embedding component 420 generates a vector representation for the surrogate entity and a set of candidate entities of the updated knowledge graph using a knowledge graph embedding algorithm. In some examples, embedding component 420 computes a distance between the surrogate entity and each of the candidate entities based on the vector representation. According to some embodiments, embedding component 420 generates a vector representation for the surrogate entity and a set of candidate entities of the updated knowledge graph. In some examples, embedding component 420 computes a distance between the surrogate entity and each of the candidate entities based on the vector representation. According to some embodiments, embedding component 420 is configured to generate a vector representation for entities of the knowledge graph. Embedding component 420 is an example of, or includes aspects of, the corresponding element described with reference to FIG. 5.

According to some embodiments, neighbor selection component 425 selects the neighboring entity from among the candidate entities based on the computed distance. In some examples, the neighboring entity is selected based on a k-nearest neighbor algorithm. According to some embodiments, neighbor selection component 425 selects a neighboring entity from among the candidate entities based on the computed distance. According to some embodiments, neighbor selection component 425 is configured to select a neighboring entity for the surrogate entity based on the vector representation. Neighbor selection component 425 is an example of, or includes aspects of, the corresponding element described with reference to FIG. 5.

According to some embodiments, user interface 440 receives a search query from a user input in a search field, where the query mention is identified from the search query. According to some embodiments, user interface 440 is configured to receive a search query and display search results corresponding to the neighboring entity. User interface 440 is an example of, or includes aspects of, the corresponding element described with reference to FIG. 5.

The described systems and methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

A system for knowledge-derived search suggestion is also described. The system may comprise an entity linking component configured to identify entities in a knowledge graph for a query mention, a knowledge graph component configured to update the knowledge graph with a surrogate entity corresponding to the at least one query mention and with a plurality of connection elements connecting the surrogate entity to the entities, an embedding component configured to generate a vector representation for entities of the knowledge graph, and a neighbor selection component configured to select a neighboring entity for the surrogate entity based on the vector representation.

A method of providing an apparatus for knowledge-derived search suggestion is described. The method includes providing an entity linking component configured to identify entities in a knowledge graph for a query mention, providing a knowledge graph component configured to update the knowledge graph with a surrogate entity corresponding to the at least one query mention and with a plurality of connection elements connecting the surrogate entity to the entities, providing an embedding component configured to generate a vector representation for entities of the knowledge graph, and providing a neighbor selection component configured to select a neighboring entity for the surrogate entity based on the vector representation.

A method of using an apparatus for knowledge-derived search suggestion is described. The method includes using an entity linking component configured to identify entities in a knowledge graph for a query mention, using a knowledge graph component configured to update the knowledge graph with a surrogate entity corresponding to the at least one query mention and with a plurality of connection elements connecting the surrogate entity to the entities, using an embedding component configured to generate a vector representation for entities of the knowledge graph, and using a neighbor selection component configured to select a neighboring entity for the surrogate entity based on the vector representation.

Some examples of the apparatus, system, and method described above further include a database storing the knowledge graph. Some examples of the apparatus, system, and method described above further include a user interface configured to receive a search query and display search results corresponding to the neighboring entity.

Some examples of the apparatus, system, and method described above further include a query processing component configured to identify the query mention from a search query. Some examples of the apparatus, system, and method described above further include a search component configured to retrieve search results corresponding to the neighboring entity in response to a search query containing the query mention.

Figure 5:
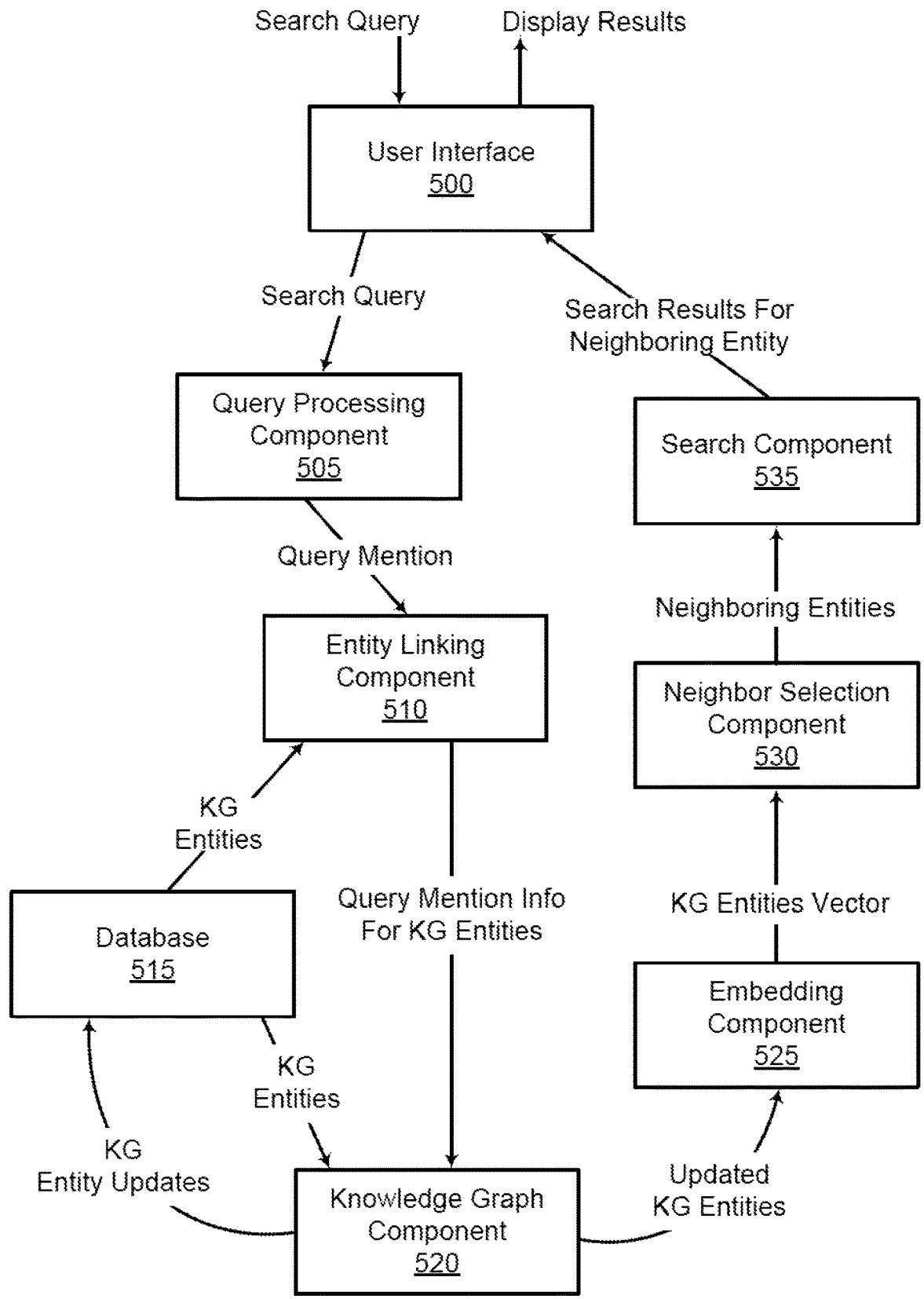
FIG. 5 shows an example of a knowledge-derived search suggestion flowchart according to aspects of the present disclosure.

FIG. 5 shows an example of a knowledge-derived search suggestion flowchart according to aspects of the present disclosure. The example shown includes user interface 500, query processing component 505, entity linking component 510, database 515, knowledge graph component 520, embedding component 525, neighbor selection component 530, and search component 535. User interface 500 is an example of, or includes aspects of, the corresponding element described with reference to FIG. 4. Entity linking component 510 is an example of, or includes aspects of, the corresponding element described with reference to FIG. 4. Database 515 is an example of, or includes aspects of, the corresponding element described with reference to FIG. 1. Knowledge graph component 520 is an example of, or includes aspects of, the corresponding element described with reference to FIG. 4. Embedding component 525 is an example of, or includes aspects of, the corresponding element described with reference to FIG. 4. Neighbor selection component 530 is an example of, or includes aspects of, the corresponding element described with reference to FIG. 4.

A user interface 500 is configured to receive a search query and display search results corresponding to the neighboring entity. A query processing component 505 is configured to identify the query mention from a search query. An entity linking component 510 is configured to identify entities in a knowledge graph for a query mention. A knowledge graph component 520 is configured to update the knowledge graph with a surrogate entity corresponding to the at least one query mention and with a plurality of connection elements connecting the surrogate entity to the entities. A database 515 stores the knowledge graph. An embedding component 525 is configured to generate a vector representation for entities of the knowledge graph. A neighbor selection component 530 is configured to select a neighboring entity for the surrogate entity based on the vector representation. A search component 535 is configured to retrieve search results corresponding to the neighboring entity in response to a search query containing the query mention.

According to some embodiments, query processing component 505 identifies a search query including a least one query mention. In some examples, the search query is based on a text query, an image, a keyword, a facet, or any combination thereof. According to some embodiments, query processing component 505 identifies a query mention. According to some embodiments, query processing component 505 is configured to identify the query mention from a search query.

According to some embodiments, search component 535 retrieves search results based on at least one neighboring entity of the surrogate entity in the updated knowledge graph. In some examples, the search results include images related to the neighboring entity. In some examples, the neighboring entity is not linked to the surrogate entity by any of the connection elements used to update the knowledge graph. In some examples, search component 535 generates an updated search query based on the neighboring entity, where the search results are retrieved based on the updated search query. In some examples, search component 535 ranks the search results based on relevance to the neighboring entity. In some examples, search component 535 organizes the search results into categories based on relevance to a set of neighboring entities in the updated knowledge graph.

According to some embodiments, search component 535 retrieves search results corresponding to the neighboring entity in response to the search query. According to some embodiments, search component 535 is configured to retrieve search results corresponding to the neighboring entity in response to a search query containing the query mention. Thus, in some examples, the embeddings of the query surrogate node and all entities of the knowledge graph are computed, then entities that are neighbors to the surrogate node in the embedding space are collected. Then, the actual names of the neighbor entities may be used to reformulate the original query. In various embodiments, different retrieval systems may be used to search based on with the reformulated query. In some examples, all documents or media objects become nodes in a knowledge graph which are connected to entities that describe them. The embeddings of the query surrogate node and all documents may be computed, and a number of nearest neighbors may be obtained as retrieval result.

As described herein, search engines (e.g., search engines for domain-specific media collections) often rely on rich metadata being available for the content items. The annotations may not be complete or rich enough to support adequate retrieval effectiveness. As a result, some search queries receive a small result set (low recall), and others might suffer from reduced relevance (low precision). The techniques described herein provide a framework with external knowledge to provide entity-oriented reformulation suggestions for queries with entities. Embodiments of the present disclosure add queries as surrogate entities to an external knowledge graph via the use of entity linking algorithms. Embedding methods are invoked on the updated knowledge graph, which contains additional edges between surrogate entities and knowledge graph entities (e.g., as described in more detail herein, for example, with reference to FIGS. 8 and 9). The present disclosure relates to an evaluation setting to evaluate the quality of these embeddings.

Query Embedding Process

Figure 6:
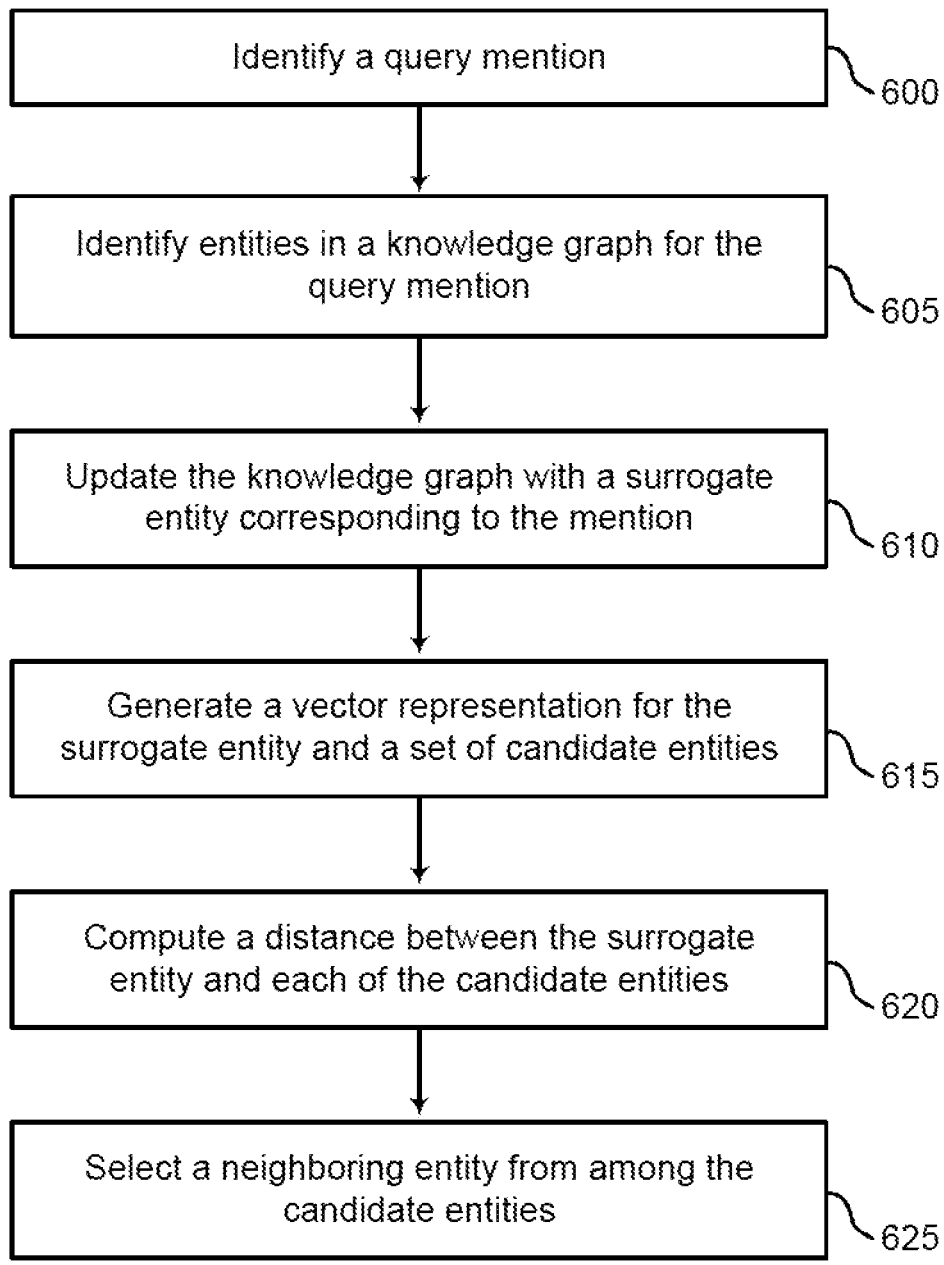
FIG. 6 shows an example of a process for knowledge-derived search suggestion according to aspects of the present disclosure.

FIG. 6 shows an example of a process for knowledge-derived search suggestion according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A method for knowledge-derived search suggestion is described. Embodiments of the method are configured to identifying a query mention, identifying entities in a knowledge graph for the query mention using a linking algorithm, updating the knowledge graph with a surrogate entity corresponding to the at least one query mention and with a plurality of connection elements connecting the surrogate entity to the entities, generating a vector representation for the surrogate entity and a plurality of candidate entities of the updated knowledge graph, computing a distance between the surrogate entity and each of the candidate entities based on the vector representation, and selecting a neighboring entity from among the candidate entities based on the computed distance.

At operation 600, the system identifies a query mention. According to some embodiments, a search query is received from a user input in a search field, where the query mention is identified from the search query. In some embodiments, the at least one query mention from the search query is identified using natural language processing. In some examples, the search query is based on a text query, an image, a keyword, a facet, or any combination thereof. Some embodiments further include retrieving search results corresponding to the neighboring entity in response to the search query. In some cases, the operations of this step refer to, or may be performed by, a query processing component as described with reference to FIG. 5.

At operation 605, the system identifies entities in a knowledge graph for the query mention using a linking algorithm. In some embodiments, the entities in the knowledge graph are identified using an entity linking algorithm. In some cases, the operations of this step refer to, or may be performed by, an entity linking component as described with reference to FIGS. 4 and 5.

At operation 610, the system updates the knowledge graph with a surrogate entity corresponding to the at least one query mention and with a set of connection elements connecting the surrogate entity to the entities. For example, in some embodiments, a confidence score corresponding to each of the entities is determined based on the entity linking algorithm, wherein each of the connection elements includes the corresponding confidence score.

In some examples, the knowledge graph comprises a plurality of entities, a plurality of relations, and a plurality of triplets including a head entity, a tail entity, and a relation between the head entity and the tail entity. In some examples, the connection elements have a same structure as the triplets. In some cases, the operations of this step refer to, or may be performed by, a knowledge graph component as described with reference to FIGS. 4 and 5.

At operation 615, the system generates a vector representation for the surrogate entity and a set of candidate entities of the updated knowledge graph. In some cases, the operations of this step refer to, or may be performed by, an embedding component as described with reference to FIGS. 4 and 5.

At operation 620, the system computes a distance between the surrogate entity and each of the candidate entities based on the vector representation. In some cases, the operations of this step refer to, or may be performed by, an embedding component as described with reference to FIGS. 4 and 5.

At operation 625, the system selects a neighboring entity from among the candidate entities based on the computed distance. In some examples, the neighboring entity is selected based on a k-nearest neighbor algorithm. In some examples, the neighboring entity is not linked to the surrogate entity by any of the connection elements used to update the knowledge graph. In some examples, the search results include images related to the neighboring entity. In some cases, the operations of this step refer to, or may be performed by, a neighbor selection component as described with reference to FIGS. 4 and 5.

An apparatus for knowledge-derived search suggestion is also described. The apparatus includes a processor, memory in electronic communication with the processor, and instructions stored in the memory. The instructions are operable to cause the processor to identify a query mention, identify entities in a knowledge graph for the query mention using a linking algorithm, update the knowledge graph with a surrogate entity corresponding to the at least one query mention and with a plurality of connection elements connecting the surrogate entity to the entities, generate a vector representation for the surrogate entity and a plurality of candidate entities of the updated knowledge graph, compute a distance between the surrogate entity and each of the candidate entities based on the vector representation, and select a neighboring entity from among the candidate entities based on the computed distance.

A non-transitory computer readable medium storing code for knowledge-derived search suggestion is described. In some examples, the code comprises instructions executable by a processor to: identify a query mention, identify entities in a knowledge graph for the query mention using a linking algorithm, update the knowledge graph with a surrogate entity corresponding to the at least one query mention and with a plurality of connection elements connecting the surrogate entity to the entities, generate a vector representation for the surrogate entity and a plurality of candidate entities of the updated knowledge graph, compute a distance between the surrogate entity and each of the candidate entities based on the vector representation, and select a neighboring entity from among the candidate entities based on the computed distance.

A system for knowledge-derived search suggestion is described. Embodiments of the system are configured to identifying a query mention, identifying entities in a knowledge graph for the query mention using a linking algorithm, updating the knowledge graph with a surrogate entity corresponding to the at least one query mention and with a plurality of connection elements connecting the surrogate entity to the entities, generating a vector representation for the surrogate entity and a plurality of candidate entities of the updated knowledge graph, computing a distance between the surrogate entity and each of the candidate entities based on the vector representation, and selecting a neighboring entity from among the candidate entities based on the computed distance.

Some examples of the method system described above further include generating one or more updated search queries based on the neighboring entity, where search results are retrieved based on the updated search query. In some cases, there may be multiple possible new queries, each of which can be issued and the results either merged together or displayed separately to the user. Some examples of the method described above further include ranking the search results based on relevance to the neighboring entity. Some examples of the method described above further include organizing the search results into categories based on relevance to a plurality of neighboring entities in the updated knowledge graph.

FIG. 7 shows an example of a process 700 for link prediction according to aspects of the present disclosure. For example, aspects of the techniques described herein use an entity linking algorithm, providing the ability to map queries to entities of an underlying knowledge graph. Knowledge-derived query suggestion relies on properly identifying the entities occurring in the query. The entity linking system can annotate the query mentions in the query with known entities and a task is concluded. However, since queries are short with limited context around the queries, entity linking algorithms may fall short in disambiguation tasks, which makes the task of query reformulation challenging. The techniques described herein may utilize various entity linking techniques (e.g., including imperfect entity linking).

The present disclosure uses entity linking algorithms to map query mentions in search queries to multiple knowledge graph entities. Several linked entities may be used because, in some cases, the entity linking method may make incorrect predictions. Considering multiple linked entities provides the ability to improve on the recall of the information retrieval model (e.g., the number of search objects retrieved by the retrieval network) of the present disclosure while maintaining precision (e.g., accuracy or relevancy) of retrieved results. Further, the output of some entity linking methods is accompanied by confidence scores. The scores can be used to weight edges, where the edges are connected to the knowledge graph entities.

Next, for each query mention m in the query set, a new node (i.e., an entity) $e_n$, is added to the knowledge graph, referred to as a surrogate entity. Surrogate entities are connected to linked entities if the surrogate entities are present in the knowledge graph. Therefore, the new triplets have the form of ($e_m$, $s_c$, $e_l$), where $e_l$ is the linked entity and $s_c$ is the confidence score. Incorporating surrogate entities into the knowledge graph changes the structure of the underlying knowledge graph and as entities are textual, new semantics are introduced, which are used in a similarity-based link prediction module.

The augmented knowledge graph is constructed, and a knowledge graph embedding algorithm may be used, such as PyTorch-BigGraph, but the present disclosure is not limited thereto. Equation (1) below may be used to find the closest tail entity. The argmin function may be used when f is a 'distance' function, and may be replaced with argmax function if f is a 'similarity' function. The knowledge graph embedding algorithm is used to compute low dimensional embeddings for entities. Given the vector representation of an entity, the present disclosure uses a link prediction model, ranking entities based on relevance to the surrogate entities. Link prediction may be defined with Eq. 1. Given a head entity h and a relation r the goal is to infer a tail entity $\hat{t}$ that completes a triplet ⟨h, r, $\hat{t}$⟩:

$$\hat{t} = \mathrm{argmax}_{e \in \varepsilon} f(h, r, e) \qquad (1)$$

where lower case notations in bold are used to refer to embeddings and f is a score function minimizing the distance between h and e. Given the embedding of a linked entity, $e_l \in \mathbb{R}^d$ and the set of embeddings $\{e_i\}$ where $0 < i < |\varepsilon|$ and $e_i \in \mathbb{R}^d$, top k similar entities are searched for in the embedding space:

$$M = k\text{-argmin}_{0 < i < |\varepsilon|} \|e_l - e_i\| \qquad (2)$$

For each surrogate entity, $e_m$, k nearest neighbors (kNN) of linked entities are determined, $e_l$ (i.e., top k entities whose embeddings are the closest to the embedding of linked entities of a specific surrogate entity). Triplets are predicted in the form of ($e_m$, score, $\hat{t}$), where $\hat{t}$ is an entity belonging to the k nearest neighbors (kNN) of $e_m$, and score is a special relation which may be defined as the distance between the corresponding linked entity and $\hat{t}$, and may represent the confidence score of the entity linking component.

Figure 8:
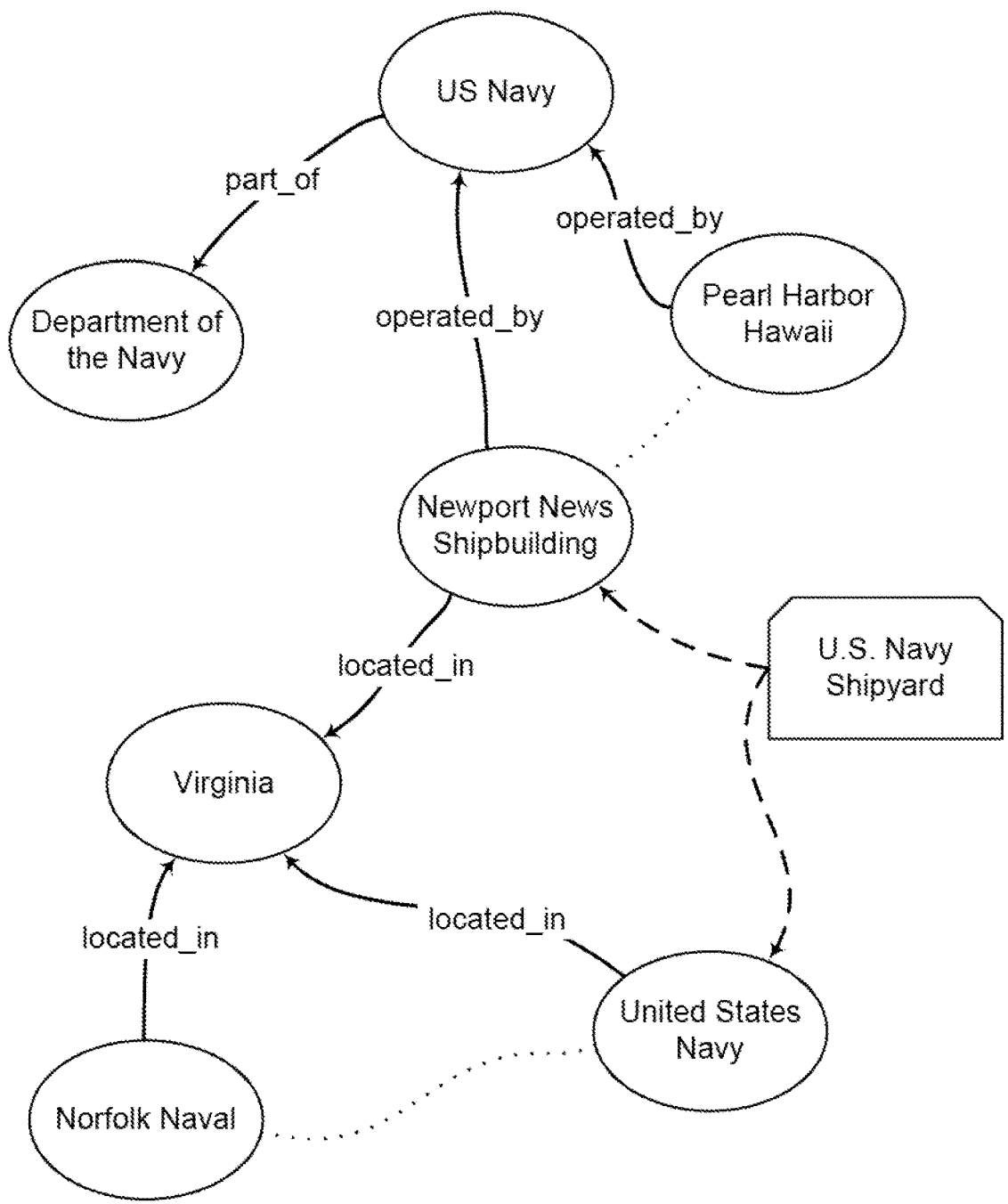
FIGS. 8 and 9 show example knowledge graphs for knowledge-derived search suggestion according to aspects of the present disclosure.

FIG. 8 shows an example of a knowledge graph for knowledge-derived search suggestion according to aspects of the present disclosure. The example shown includes query 800, knowledge graph entities 810, and predicted link 820. Query 800 is an example of, or includes aspects of, the corresponding element described with reference to FIG. 9. Knowledge graph entities 810 is an example of, or includes aspects of, the corresponding element described with reference to FIG. 9. Entity links 805 are examples of, or includes aspect of, the corresponding elements described with reference to FIG. 9. Knowledge graph relations 815 are examples of, or include aspects of, the corresponding aspects described with reference to FIG. 9. Predicted link 820 is an example of, or includes aspects of, the corresponding element described with reference to FIG. 9.

In one embodiment, the information retrieval model of the present disclosure (e.g., the retrieval network described herein) may use entity linking techniques for determining entity links 805 between a query 800 (e.g., query mentions in a sequence, q, corresponding to query 800) and knowledge graph entities 810 (e.g., as further described herein for example, with reference to FIG. 7). In one embodiment, knowledge graph entities 810 include knowledge graph relations 815 amongst each other. For instance, in the example of FIG. 8, a query 800 may include 'U.S. Navy Shipyard,' and entity linking 805 may link the query 800 (e.g., or a query mention 800) to knowledge graph entities 810 including 'Newport News Shipbuilding' and 'United States Navy.' Based on the techniques described herein, a predicted link 820 may be established and a reformulated query (e.g., a suggested updated query) 'Pearl Harbor Hawaii,' 'Norfolk Naval,' or both. As shown in FIG. 3, such an updated query (e.g., updated query 810) may result in more numerous search objects retrieved, more precise (e.g., relevant) search objects retrieved, or both.

Knowledge graphs (e.g., such as the knowledge graphs shown in FIGS. 8 and 9) organize information and objects into graph structure in which entities (e.g., knowledge graph entities 810), such as nodes, can be traversed through relations 815 (i.e., edges). A traversal creates a fact which includes entities (head and tail entities) and a relation between the entities (i.e., (head, relation, tail)). Knowledge graphs have many applications, such as Word Sense Disambiguation in natural language queries. For example, the word "bass" can refer to a type of fish or describe low tones in music, and are different entities in the knowledge graph. The word has a different local structure and different representation, which helps disambiguate different senses of the word. Knowledge graphs are sparse data structures, where the number of facts per entity is small. For example, some real-world knowledge graphs have a fact-to-entity ratio of 16, motivating work on link prediction tasks. Link prediction is the task of inferring new relations among entities given a snapshot of a graph. Link prediction has many applications, from friendship suggestions in social networks to predicting associations between molecules in biological networks.

The task of finding candidate query suggestions is an application of link prediction. For example, in entity oriented search with low recall, knowledge graph entities are ranked as tail entity candidates using a link prediction model. The link prediction model ranks related entities globally or to a selected relation type and can use high ranked predicted tails as suggested queries for respective head entities. Entity linking may be used, where the correct linking of mentions in the query is provided to the entities of the underlying knowledge graph.

There are inherent limitations in the use of entity linking algorithms, especially when there is limited context in the query. It is difficult to distinguish between different instances of a word if there is no context around the word. As a result, there is a chance of error in entity linking, which can propagate through the link prediction phase and produce incorrect candidates.

Embodiments of the present disclosure provide a framework for transforming the output of entity linking operations to a single vector representation, which serves as the input for link prediction techniques. The present disclosure is robust and leads to a significant lift of the link prediction performance in cases where entity linking methods fail. Surrogate entities are the presence of queries in the knowledge graph. A new node, referred to as a surrogate entity, is added to the knowledge graph for each mention in the query and connects the new node to the linked entities (output of the entity linking algorithm). The inclusion of surrogate entities improves the semantics of the knowledge graph by adding different senses of a query to the knowledge graph. Link prediction is then performed on the enhanced knowledge graph (based on similarity in the embedding space, for example, as further described with reference to FIG. 7). Additionally, a query suggestion study may demonstrate how providing additional knowledge to the knowledge graph can disambiguate the user intent that may be present in a search query received from a user. For instance, users may not know that to retrieve information (e.g., search objects) on a specific subject specific keywords may work better than others. Accordingly, the techniques described herein may be implemented for an information retrieval network to effectively guide the user to reformulated (e.g., updated) search queries to improve the search experience.

Embodiments of the present disclosure provide a framework that tolerates low-performing entity linking when combined with link prediction as the downstream task. The present disclosure adds surrogate entities to an updated knowledge graph that represent query entities to an existing knowledge graph.

The information retrieval model of the present disclosure uses an external knowledge graph embedding. Some methods use knowledge graph embeddings (KGE) for tasks related to query suggestion. Suggesting graph-queries may be used for exploring knowledge graphs. However, in some examples, the information retrieval model described herein may use different methods. In some examples, query suggestions may use user log data such as clicks. Such user log data can comprise user queries and the images or other assets that they clicked on as well as subsequent queries that they issued in the same session. By linking information from the mentions in the query to information about the clicked assets and by linking information in sequences of queries, the system can further disambiguate the intended meaning of the query and hence the linked entities of the query.

Some methods conduct a large-scale study investigating query reformulations by users. A reinforcement learning approach uses a seq2seq model trained with user query log data to perform query reformulations. Embodiments of the present disclosure use knowledge graphs or embeddings from the knowledge graphs for query reformulation tasks (e.g., updated search query suggestions).

In some embodiments, entity linking in the present disclosure maps a word in the query (e.g., a query mention) to a corresponding entity in the knowledge graph. Many recent approaches for entity linking use reinforcement learning as well as graph embeddings for entity disambiguation. Embodiments of the present disclosure may implement various techniques to map the sequence of words in the search query to the corresponding entities in the knowledge graph. Link prediction may be implemented in social networks, web graphs, biological networks, information networks, and knowledge graphs. Methods for link prediction may be based on either the notion of proximity (e.g., distance) in the graph or the notion of structural similarity/roles. Complex link prediction methods have been developed recently using embeddings derived from graph autoencoders, graph neural networks, spectral methods, etc. While some methods use transductive (within-network) link prediction, there are some inductive (across-network) link prediction methods. Some link prediction methods for knowledge graphs are based on proximity/distance in the graph and use paths, tensor factorizations, random walks, and other local proximity-based mechanisms. Some methods enrich a graph to improve link prediction using multilingual textual descriptions. The present disclosure is agnostic to a link prediction method and can naturally use any link prediction approach.

Figure 9:
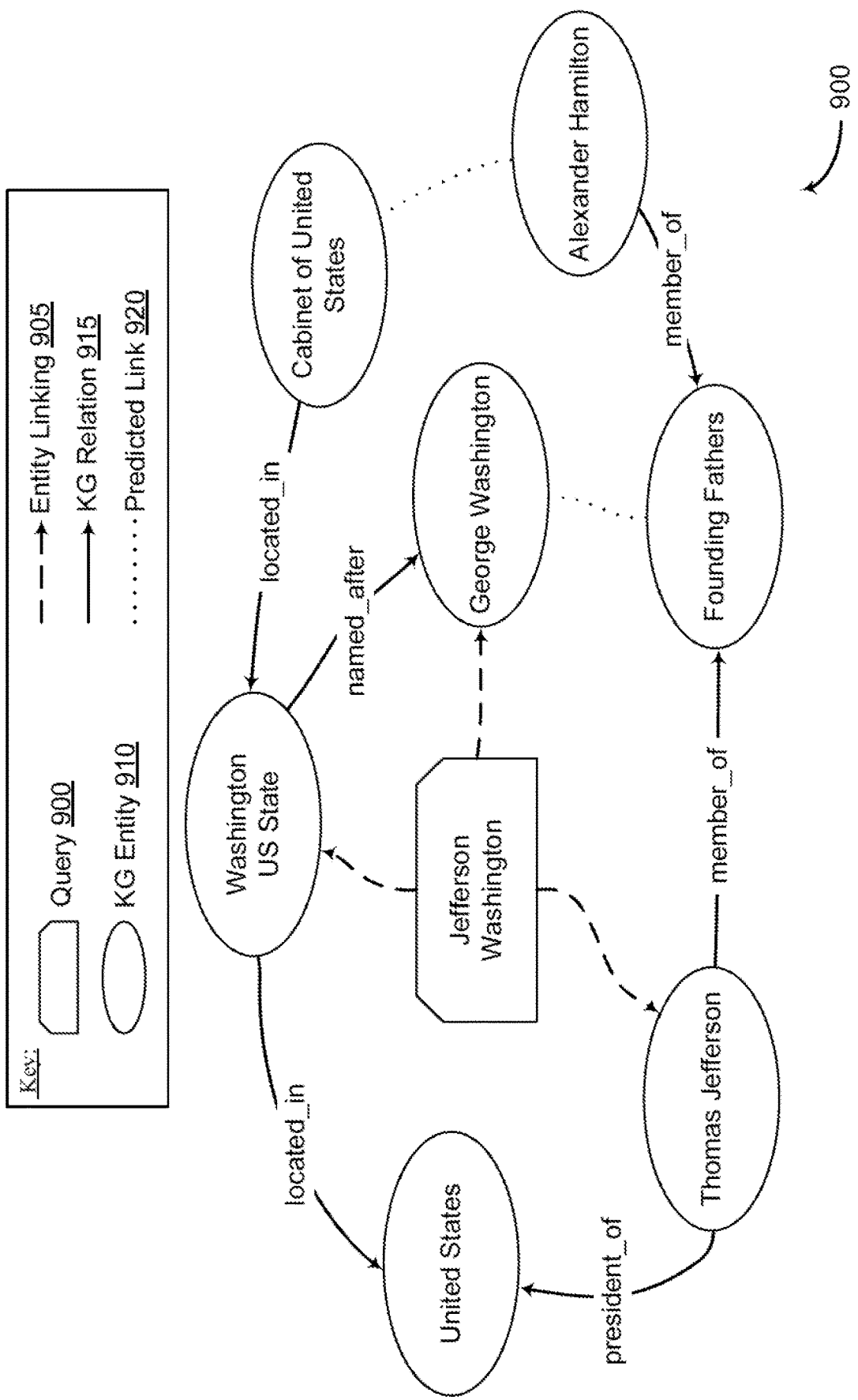

For example, for a knowledge graph (e.g., such as the knowledge graph described herein, for example, with reference to FIGS. 8 and 9), let $\mathcal{G}=(\varepsilon, \mathcal{R}, \mathcal{T})$ be the knowledge graph, where $\varepsilon$ is a set of entities, $\mathcal{R}$ is a set of relations, and $\mathcal{T}$ is a set of triplets in the form of (h,r,t) where h, t∈ε are head and tail entities and r∈$\mathcal{R}$ is a relation between two entities.

For performing entity linking 805, let Q={$q_1$, . . . , $q_n$} be a set of textual queries. Query q is defined as a sequence of words q=($w_1$ . . . $w_v$). A subsequence of words in q representing an entity e (e.g., a knowledge graph entity 810) is called query mention and denoted by m if e∈ε. The process of mapping mention m to entity e is called Entity Linking, EL: m ↦ e.

In some aspects, query suggestion tasks may be considered as a ranking formulation where a set of candidate suggested queries (e.g., q') are ranked and provided to the user given an initial query, q, and a score function, score (q, q'). Some methods take q and predict the next query using a sequence to sequence model P ($q_{i+1}$|$q_i$, score) without taking rare and out-of-vocabulary words into account. Embodiments of the present disclosure can use an underlying knowledge graph in the process to use rare and out-of-vocabulary words. Entities of a knowledge graph are meaningful suggestions for user information because the entities are curated textual objects whose coverage is not limited based on word popularity. An entity linking algorithm is used to enable the use of a knowledge graph, which assigns a set of n entities from a knowledge graph to the target query and use these linked entities to find relevant entities to the initial query. A knowledge graph $\mathcal{G}=(\varepsilon, \mathcal{R}, \mathcal{T})$, and a query q∈$\mathcal{Q}$ the goal is to return a ranked list of relevant entities, ⟨$e_1$, $e_2$, . . . , $e_k$⟩ where $e_i$∈ε and relevance is inferred based on the Euclidean distance in the embedding space.

Accordingly, inserting surrogate entities and connecting the surrogate entities to linked entities introduces diverse but related knowledge to the original knowledge graph which improves the semantic of the knowledge graph by adding different senses of a query to the knowledge graph. Additionally or alternatively, inserting surrogate entities and connecting the surrogate entities to linked entities increases the recall of the search as the search becomes more likely to find similar entities to the query as a result of added connections (i.e., edges).

In some embodiments, link prediction may be used to evaluate the information retrieval model of the present disclosure, which is the task of predicting whether a specific triplet exists in the knowledge graph. Assuming embedding of all entities, link prediction may be defined as: for each surrogate entity, $e_m$, find k nearest neighbors (kNN) of its linked entities (i.e., top k entities whose embeddings are the closest to embedding of linked entities of that specific surrogate entity). Triplets are predicted in the form of ($e_m$, $r_d$, t̂), where t̂ is an entity belonging to kNN of $e_m$, and $r_d$ is a special relation which is defined as the distance between the corresponding linked entity and t̂. A number of predicted links that are present in the knowledge graph are calculated (e.g., if the top 1, 10, 25, and 50 linked entities are considered). The number of predicted links are normalized by the number of total predicted links to obtain Hits@k measures.

FIG. 9 shows an example of a knowledge graph for knowledge-derived search suggestion according to aspects of the present disclosure. The example shown includes query 900, knowledge graph entities 910, and predicted link 920. Query 900 is an example of, or includes aspects of, the corresponding element described with reference to FIG. 8. Entity links 905 are examples of, or include aspects of, the corresponding elements described with reference to FIG. 8. Knowledge graph entities 910 are examples of, or include aspects of, the corresponding elements described with reference to FIG. 8. Knowledge graph entities 910 are examples of, or include aspects of, the corresponding aspects described with reference to FIG. 8. Knowledge graph relations 915 is an example of, or includes aspects of, the corresponding element described with reference to FIG. 8. Predicted link 920 is an example of, or includes aspects of, the corresponding element described with reference to FIG. 8.

In one embodiment, the information retrieval model of the present disclosure (e.g., the retrieval network described herein) may use entity linking techniques for determining entity links 905 between a query 900 (e.g., query mentions in a sequence, q, corresponding to query 900) and knowledge graph entities 910 (e.g., as further described herein for example, with reference to FIG. 7). In one embodiment, knowledge graph entities 910 include knowledge graph relations 915 amongst each other. For instance, in the example of FIG. 9, a query 900 may include 'Jefferson Washington,' and entity linking 905 may link the query 900 (e.g., or a query mention 900) to knowledge graph entities 910 including 'Washington US State,' 'George Washington,' and 'Thomas Jefferson.' Based on the techniques described herein, a predicted link 920 may be established between 'George Washington' and 'Founding Fathers,' in addition to a predicted link 920 established between 'Alexander Hamilton' and 'Cabinet of United States.'

As described above, some models modify search queries by adding, removing, and/or modifying keywords, and the models map mentions in search queries to known entities in the word embedding space. Distributional word embeddings have a small coverage for named entities. For example, named entities may be out-of-vocabulary words. Entity linking may not result in perfectly accurate entity links 905 between knowledge graph entities 810. The knowledge graph (knowledge graph) structure may be used to find related knowledge graph entities 810. Let $\mathcal{G} =(\varepsilon, \mathcal{R}, \mathcal{T})$ be the knowledge graph, where $\varepsilon$ is a set of textual entities, $\mathcal{R}$ is a set of textual relations, and $\mathcal{T}$ is a set of triplets in the form of (h,r,t) where h,t$\in \varepsilon$ are head and tail entities and r$\in \mathcal{R}$ is a relation between two entities.

Let $Q=\{q_1, \ldots, q_n\}$ be a set of textual queries. Query q is defined as a sequence of words $q=(w_1 \ldots w_v)$. A subsequence of words in q representing an entity e is called query mention and denoted by m if e$\in \varepsilon$. The process of mapping mention m to entity e is called Entity Linking, EL: $m \mapsto e$.

Graph embeddings (e.g., embedding techniques that use graph structure and compute embeddings for vertices) may be efficiently computed. For instance, rather than collecting multiple training sentences for standard word embeddings, such as word2vec, an entity in a graph occurs once with relations to other entities. A space of named entities is much larger than words in dictionaries or the words occurring in pre-trained word embeddings. Systems (e.g., such as Pytorch-BigGraph) can compute embeddings for large-scale scenarios. Standard word embedding techniques can be used for the embeddings of vertices by sample sequencing for a vertex by traversing a graph. Graph embedding techniques have been implemented (e.g., in the BigGraph framework).

In an example scenario of a search shown in FIG. 9, a search query 900 of 'Jefferson Washington' with a search intent of Thomas Jefferson and George Washington is input to a search engine (e.g., an information retrieval network described herein). 'Washington' and 'Jefferson' are mentioned in the query and the surrogate entity is Washington_Jefferson_Q, where the Q is a distinct identifier. For Washington, entity linking may be Washington_state, Washington_DC, George_Washington, or University_of_Washington. Entity linking for Jefferson may be Thomas_Jefferson, Jefferson_Memorial, etc.

Washington_state and University_of_Washington may be considered low probability entity links in conjunction with Thomas_Jefferson being included in the search query 900. Possible Query suggestions based on related entities within the graph may be Declaration_of_independence, US_First_Cabinet, US_Founding_Fathers, US_Constitution, or Alexander_Hamilton.

Low-likelihood query suggestions based on related entities may be Federal_Hall, Mount_Vernon, Washington_&_Jefferson_College, Martha_Washington, or Jefferson_Memorial. Colleges are named after Washington and Jefferson but is not high profile for either person. Additionally, the order of words is wrong for this named entity. Martha_Washington is in close relation to George_Washington but when combined with Thomas_Jefferson, the probability drops. The Jefferson_Memorial in Washington_DC but compared to the strength of the other entities is low. Additionally, the Jefferson Memorial may have the mention "memorial" included.

Evaluation

According to some embodiments of the present disclosure, metrics and experiments may be used to measure the performance of aspects of techniques described herein. The results of these experiments indicate that embodiments of the present disclosure provide improved information retrieval systems compared to existing alternatives. For instance, an entity linking-link prediction pipeline problem setting may be evaluated. A case study may be performed to demonstrate the effectiveness of the present disclosure qualitatively.

One approach to assess the quality of the outcome of a search engine is to measure how satisfied the users are with the results (e.g., with the search results). User satisfaction may be quantified using several methods in information retrieval community, such as the relevance of the results to the query or quantifying the click information, etc. The system can be assessed when the ground truth information regarding the relevance of the attained documents to the target query is available. However, a set of queries may not yield satisfactory results when issued to a search engine and ground truth is not obtainable.

A set of entities are provided as a suggestion to reformulate the target query by the link prediction setting. Since surrogate entities that are not present in the ground truth are added, the standard link prediction setting may not be used to evaluate the present disclosure. Two settings may be used for evaluation. One is a rank-based evaluation technique measuring how well the distance metric ranks the entities. The other is based on a similarity between what is predicted and what users click in the contextual word embedding space.

As described earlier, a surrogate entity corresponds to an entity in a query represented in the knowledge graph. A surrogate entity is connected to n entities obtained by entity linking algorithm, and k other entities per linked entity are predicted if the linked entity exists in the knowledge graph. Therefore, n×k predicted entities may be produced. The entity's Euclidean distance from an associated linked entity is considered for sorting the entities.

To evaluate the sorted list of predicted links the number of predicted links that are present are counted in the knowledge graph. The number of predicted links are normalized using the number of predicted links to obtain Hits@k:

$$\text{Hits}@k = \Sigma_{i=1}^{|L|} 1 \text{ if rank}_{(h,r,t)_i} \leq k \qquad (3)$$

Additionally, a ranked list of entities is output, and a measure may be applied to knowledge graph entities. Given the ranked list of predicted links per query, the predicted links per query are noted as relevant if the predicted links per query exists in the knowledge graph and calculate the variable AP using the following equation:

$$AP = \frac{1}{n_r} \sum_{i=1}^{n} (P(i) \times rel(k)) \qquad (4)$$

where $n_r$ is the number of relevant links, $rel(k) \in \{0, 1\}$ indicates if the link is relevant or not, and P(i) is the precision at i in the ranked list. Once AP is obtained for each query, an average is determined across the queries to find MAP:

$$MAP = \frac{1}{N} \sum_{q=1}^{N} AP(q) \qquad (5)$$

where N is the number of queries.

In addition to rank-based metrics, the present disclosure provides techniques to capture a relatedness of the suggested queries to the intended query by measuring the similarity between the two. The similarity can be defined in text space or in the embedding space. Lexical similarity may be used to measure relevance. Jaro-Winkler distance method may be used to capture spelling mismatches.

$$sim_{lex}=\max(1-\text{dist}(\hat{t},q))$$

where $\hat{t}$ is the predicted tail entity and q is the target query.

In an example scenario, if click information of a user is available, the present disclosure may further measure the quality of suggested queries. A word embedding algorithm can be used to obtain the vector representations of the target query and the suggested query and calculate the cosine similarity of the two vectors and report the cosine similarity as a performance measure. A dataset can be used which provides session-based query log information. Given two embedding vectors, $e_t$ and $\hat{t}$, the performance measure is defined as follows:

$$sim_{emb} = \frac{e_t \cdot \hat{t}}{\|e_t\|\|\hat{t}\|}$$

In a proposed problem setting, the baseline is defined as comparing the information retrieval model of the present disclosure with the case where links are predicted in the form of (entity linking(m), score, $\hat{t}$), where entity linking(m) is the top linked entity for the mention m and score is the distance between the corresponding linked entity and $\hat{t}$. Additionally, an upper bound can be established for the model of the present disclosure, called the gold standard, in which the true entity for each mention can be known and predict links in the form of (s, score, $\hat{t}$) where s is the true linked entity for mention m, resulting in an error-free entity linking oracle.

True entity is the label linking mentions to knowledge base entities. The labels are used to measure the performance of the entity linking and investigate how performance affects the performance of a final information retrieval model. Rank-based metrics are reported for some or all datasets because the baseline and the upper bound can be established.

A dataset of a collection of web queries can be used to evaluate similarity-based metrics. Time stamp data and click through information are available. If the user clicks on a search result, the rank of the clicked item is also listed. The presence of click information provides the ability to perform similarity-based evaluation. Queries are separated into sessions (e.g., where 30 minutes may be considered a session). The queries in each session form a context for the target query (the last query in a session is the target query if the user clicks on the search result). Basic preprocessing can be performed (e.g., removing punctuation and converting to lower case), and select sessions (e.g., 10,000 sessions) in random for the experiment In an example scenario, a dataset of queries providing query information are used. Ground truth and click information are not provided. Therefore, the evaluations could be performed on the dataset. As a result, queries (e.g., 50 queries) may be chosen and asked (e.g., 20) annotators to annotate the search result from specific search engines. Given the annotated pairs of queries and search results, the quality of suggested queries can be determined.

As an underlying knowledge graph, a dataset with entities and relations can be used and relations can be removed. The knowledge graph may be used for the task of graph completion, and can be used as an external source of knowledge to suggest alternative queries. The existing mapping may be used between the entities the dataset, denoted by mids, and data entities. The existing mapping may be used because the entity linking algorithm maps the mentions to data entities. A reduced version of the dataset can be constructed to consider the intersection of the linked entities of the query log mentions and the knowledge graph entities.

To report rank-based results, the predicted links are compared to links predicted by baseline and gold standard, resulting in, for example, hits@10, hits@50 and MAP metrics. The performance of the present disclosure lies between the performance of baseline and the gold standard, outperforming the baseline in the datasets.

In an example scenario, a case when the accuracy of entity linking is at a maximum is considered. Performance of baseline experiences a considerable increase. For instance, there is a 100% increase in hits@10 because the top linked entity would be the same as the correct entity, suggesting that the present disclosure is helpful when entity linking fails which is the case for short queries.

The cumulative precision regarding distance can also be considered, which can be used to rank the suggested queries. The predicted links are sorted based on distance. Precision can be calculated for each threshold considering the links with a distance between 0 and threshold. Precision at a threshold may be the precision when considering the predicted links. Data need not be filtered out based on the distance. A sigmoid shape with the middle at 0.5 (similar to the gold standard) may be observed. The information retrieval model of the present disclosure is also following a similar trend. The precision of the baseline varies up to about 0.4 and is not monotonic.

For similarity-based results, entity linking can performed in the context of each session and predict tails using the baseline and the present disclosure. Lexical and semantic similarity metrics are used to measure relevance. For lexical similarity, for example, 59.3% similarity can be obtained between the predicted tail and the target query, based on click information available in the dataset. Additionally, 48.2% similarity can be achieved when using the baseline.

The embedding of the top predicted tail can be computed in each approach (using a pretrained BERT model). Then the system may also compute the embedding of the target query and calculate the cosine similarity between the two embeddings per session. The present disclosure determines a 90.6% for cosine similarity averaged across the sessions compared to 86.3% for baseline.

The impact of the suggested query candidate is investigated in an example scenario based on 50 queries and 20 participants, as an example. Participants judge the relevance of a result snapshot as either obtained by certain image search engines. Basic variants of using suggested entities as search queries produced by the baseline are considered, and the present disclosure uses exclusively suggested entities as query and uses the original query in conjunction with the suggested entities.

Overall, with a rather low overall Krippendorff's $\alpha=0.55$, using Knowledge-Derived Query Suggestion techniques such as the introduced baseline or the present disclosure lead, on average, to 57% relevant retrieval results, improving experiment configurations compared to the baseline. While one image search produces more relevant results compared to another image search due to a larger repository, the present disclosure has the largest impact on the other image search relative to the baseline. Embodiments of the present disclosure tend to produce larger inter-rater reliability.

A Krippendorff's α of 0.7 provides tentative conclusions and can be achieved with the removal of 26% of queries with the highest rating variance. Independent of the setup, in 64.8% of participants found the results relevant.

The present disclosure provides a query suggestion framework using an external source of knowledge, such as a knowledge graph. Using entity linking techniques, the present disclosure uses queries in the knowledge graph as surrogate entities and showed how an inclusion of surrogate entities improved the semantic of the knowledge graph by incorporating different senses of a query and as a result boosted the performance. A link prediction mechanism may be used to return a ranked list of similar queries to the linked entities and metrics to evaluate the list of predicted links (i.e., suggested queries). Experiments are performed on seven benchmark datasets to show improvements of the present disclosure compared to the baseline.

The information retrieval model of the present disclosure suggests an alternative query, but a hierarchical encoding scheme can enable users to have the ability to choose from generalization, i.e., integrating suggested entities into a higher-level entity, e.g., student and faculty into university member, or specialization, i.e., identifying sub-groups of the target query, e.g., employee to developer and engineer.

In the baseline, the present disclosure is compared to a case where links are predicted in the form of (entity linking (m), $r_d$, $\hat{t}$), where entity linking(m) is the top linked entity for the mention m and $r_d$ is the distance between the corresponding linked entity and $\hat{t}$. Additionally, an upper bound is established for the present disclosure in which the true entity is known for each mention and predict links in the form of (s, $r_d$, $\hat{t}$) where s is the true linked entity for mention in which means we have an error-free Entity Linking oracle.

The performance of our approach always lies between the baseline and gold standard. The baseline performs much better when entity linking accuracy is 69%, which makes sense as in this case the top linked entity would be the same as the correct entity. The present disclosure is useful when entity linking fails, which is usually the case when dealing with real world queries.

Experiments show the present disclosure improves compared to the baseline and multiple reasons could cause the low performance in general. One reason is that the knowledge graph is small. Larger knowledge graph increases the overlap between linked entities and knowledge graph entities and consequently increases the chance of hit in link prediction.

The description and drawings described herein represent example configurations and do not represent all the implementations within the scope of the claims. For example, the operations and steps may be rearranged, combined, or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for search querying, comprising:
   identifying a search query comprising at least one query mention;
   updating a knowledge graph by adding a surrogate entity as an additional node in the knowledge graph and a surrogate entity connection element as an additional edge in the knowledge graph, wherein the surrogate entity corresponds-to the at least one query mention, and wherein the surrogate entity connection element comprises a triplet structure including the surrogate entity;
   generating a vector representation for the surrogate entity based on the surrogate entity connection element using a knowledge graph embedding algorithm;
   predicting a link between a first entity other than the surrogate entity and a second entity other than the surrogate entity based on the surrogate entity;
   identifying at least one neighboring entity based on the vector representation for the surrogate entity and the predicted link;
   retrieving a search result based at least in part on the at least one neighboring entity; and
   displaying the search result to a user.

2. The method of claim 1, further comprising:
   identifying the at least one query mention from the search query using natural language processing.

3. The method of claim 1, further comprising:
   identifying a linked entity in the knowledge graph using an entity linking algorithm, wherein the surrogate entity connection element connects the surrogate entity and the linked entity.

4. The method of claim 3, further comprising:
   determining a confidence score for the linked entity based on the entity linking algorithm, wherein the surrogate entity connection element includes the confidence score.

5. The method of claim 1, further comprising:
   generating a vector representation for a plurality of candidate entities of an updated knowledge graph using the knowledge graph embedding algorithm;
   computing a distance between the surrogate entity and each of the plurality of candidate entities based on the vector representation for the surrogate entity and the plurality of candidate entities; and
   selecting the at least one neighboring entity from among the plurality of candidate entities based on the computed distance.

6. The method of claim 5, wherein:
the at least one neighboring entity is selected based on a k-nearest neighbor algorithm.

7. The method of claim 1, wherein:
the knowledge graph comprises a plurality of nodes and a plurality of edges including a head entity, a tail entity, and a relation between the head entity and the tail entity.

8. The method of claim 1, wherein:
the search result includes images related to the at least one neighboring entity.

9. The method of claim 1, wherein:
the at least one neighboring entity is not linked to the additional node by the surrogate entity connection element.

10. The method of claim 1, further comprising:
generating an updated search query based on the at least one neighboring entity, wherein the search result is retrieved based on the updated search query.

11. The method of claim 1, further comprising:
retrieving a plurality of search results and ranking the plurality of search results based at least in part on relevance to the at least one neighboring entity.

12. The method of claim 1, further comprising:
retrieving a plurality of search results and organizing the plurality of search results into categories based on relevance to a plurality of neighboring entities.

13. The method of claim 1, wherein:
the search query is based on a text query, an image, a keyword, a facet, or any combination thereof.

14. A method for search querying, comprising:
identifying at least one query mention;
identifying entities in a knowledge graph for the at least one query mention using a linking algorithm;
updating the knowledge graph by adding a surrogate entity as an additional node in the knowledge graph and a surrogate entity connection element as an additional edge in the knowledge graph, wherein the surrogate entity corresponds-to the at least one query mention, and wherein the surrogate entity connection element comprises a triplet structure including the surrogate entity;
generating a vector representation for the surrogate entity and a plurality of candidate entities based on the surrogate entity connection element using a knowledge graph embedding algorithm;
predicting a link between a first entity other than the surrogate entity and a second entity other than the surrogate entity based on the surrogate entity;
computing a distance between the surrogate entity and each of the plurality of candidate entities based on the vector representation;
selecting at least one neighboring entity from among the plurality of candidate entities based on the computed distance and the predicted link;
retrieving a search result based at least in part on the at least one neighboring entity; and
displaying the search result to a user.

15. The method of claim 14, further comprising:
receiving a search query from a user input in a search field, wherein the at least one query mention is identified from the search query; and
retrieving search results corresponding to the at least one neighboring entity in response to the search query.

16. An apparatus for search querying, comprising:
a processor;
a memory including instructions, where the instructions are executable by the processor to perform functions including:
identifying entities in a knowledge graph for at least one query mention;
updating the knowledge graph by adding a surrogate entity as an additional node in the knowledge graph and a surrogate entity connection element as an additional edge in the knowledge graph, wherein the surrogate entity corresponds-to the at least one query mention, and wherein the surrogate entity connection element comprises a triplet structure including the surrogate entity;
generating a vector representation for the surrogate entity based on the surrogate entity connection element using a knowledge graph embedding algorithm;
predicting a link between a first entity other than the surrogate entity and a second entity other than the surrogate entity based on the surrogate entity;
selecting a neighboring entity for the surrogate entity based on the vector representation and the predicted link;
retrieving a search result based at least in part on the neighboring entity; and
displaying the search result to a user.

17. The apparatus of claim 16, further comprising: a database storing the knowledge graph.

18. The apparatus of claim 16, wherein the instructions are further executable by the processor to identify the at least one query mention from a search query.

\* \* \* \* \*